(12) United States Patent
Rogers et al.

(10) Patent No.: US 6,757,415 B1
(45) Date of Patent: Jun. 29, 2004

(54) METHOD FOR DETERMINING FEATURES FROM DETECTIONS IN A DIGITAL IMAGE USING A BAUER-FISHER RATIO

(75) Inventors: Steven K. Rogers, Beavercreek, OH (US); Kenneth W. Bauer, Fairborn, OH (US); Michael J. Collins, Beavercreek, OH (US); Martin P. DeSimio, Fairborn, OH (US); Richard A. Mitchell, Springboro, OH (US)

(73) Assignee: Qualia Computing, Inc., Beavercreek, OH (US)

( * ) Notice: Subject to any disclaimer, the term of this patent is extended or adjusted under 35 U.S.C. 154(b) by 0 days.

(21) Appl. No.: 10/461,301

(22) Filed: Jun. 13, 2003

Related U.S. Application Data

(62) Division of application No. 09/602,762, filed on Jun. 23, 2000.
(60) Provisional application No. 60/140,636, filed on Jun. 23, 1999.

(51) Int. Cl.[7] .................................................. G06K 9/00
(52) U.S. Cl. ......................................... 382/130; 382/132
(58) Field of Search ........................................... 382/130

(56) References Cited

U.S. PATENT DOCUMENTS

| 4,453,266 A | 6/1984 | Bacus |
| 4,723,553 A | 2/1988 | Miwa et al. |
| 4,736,439 A | 4/1988 | May |
| 4,747,156 A | 5/1988 | Wahl |

(List continued on next page.)

FOREIGN PATENT DOCUMENTS

| EP | 0617380 A2 * | 9/1994 | ............ G06K/9/64 |
| WO | 02/42998 | 5/2002 | |

OTHER PUBLICATIONS

Winsberg, M.D., F., et al., "Detection of Radiographic Abnormalities in Mammograms by Means of Optical Scanning and Computer Analysis," *Radiology*, vol. 89, Aug. 1967, (pp. 211–215).

Ackerman, L.V., "Computer Classification of Radiographs and Xerograms of the Breast," Ph.D. Dissertation, University of Illinois at the Medical Center, Oct. 1970.

Hall, E.L., et al., "A Survey of Preprocessing and Feature Extraction Techniques for Radiographic Images," *IEEE Transactions on Computers*, vol. C–20, No. 9, Sep. 1971, (pp. 1032–1044).

(List continued on next page.)

*Primary Examiner*—Leo Boudreau
*Assistant Examiner*—H Akhavannik
(74) *Attorney, Agent, or Firm*—Stevens & Showalter LLP

(57) ABSTRACT

A computer aided detection method and system to assist radiologists in the reading of medical images. The method and system has particular application to the area of mammography including detection of clustered microcalcifications and densities. A microcalcification detector is provided wherein individual detections are rank ordered and classified, and one of the features for classification is derived using a multilayer perceptron. A density detector is provided including an iterative, dynamic region growing module with embedded subsystem for rank ordering and classification of a best subset of candidate masks. Features are computed from a detection on an input image by providing first and second regions on the input image corresponding to areas inside and outside the detection, measurements are computed based on values derived from the two regions, a standard deviation is computed for the measurements in each region, and a feature for the detection is computed using a Bauer-Fisher ratio. A post processing stage is provided where detections are analyzed in the context of a set of images for a patient. The final output of the system is a set of indications overlaid on the input medical images.

3 Claims, 15 Drawing Sheets

U.S. PATENT DOCUMENTS

| | | | |
|---|---|---|---|
| 4,907,156 A | 3/1990 | Doi et al. | |
| 5,133,020 A | 7/1992 | Giger et al. | |
| 5,212,637 A | 5/1993 | Saxena | |
| 5,260,871 A | 11/1993 | Goldberg | |
| 5,268,967 A | 12/1993 | Jang et al. | |
| 5,289,374 A | 2/1994 | Doi et al. | |
| 5,291,560 A | 3/1994 | Daugman | |
| 5,331,550 A | 7/1994 | Stafford et al. | |
| 5,343,390 A | 8/1994 | Doi et al. | |
| 5,359,513 A | 10/1994 | Kano et al. | |
| 5,365,429 A | 11/1994 | Carman | |
| 5,388,143 A | 2/1995 | MacMahon | |
| 5,452,367 A | 9/1995 | Bick et al. | |
| 5,463,548 A | 10/1995 | Asada et al. | |
| 5,491,627 A | 2/1996 | Zhang et al. | |
| 5,537,485 A | 7/1996 | Nishikawa et al. | |
| 5,572,565 A | 11/1996 | Abdel-Mottaleb | |
| 5,574,799 A | 11/1996 | Bankman et al. | |
| 5,579,360 A | 11/1996 | Abdel-Mottaleb | |
| 5,586,160 A | 12/1996 | Mascio | |
| 5,598,481 A | 1/1997 | Nishikawa et al. | |
| 5,615,243 A | 3/1997 | Chang et al. | |
| 5,622,171 A | 4/1997 | Asada et al. | |
| 5,625,717 A | 4/1997 | Hashimoto et al. | |
| 5,627,907 A | 5/1997 | Gur et al. | |
| 5,633,948 A | 5/1997 | Kegelmeyer, Jr. | |
| 5,638,458 A | 6/1997 | Giger et al. | |
| 5,657,362 A | 8/1997 | Giger et al. | |
| 5,661,820 A | 8/1997 | Kegelmeyer, Jr. | |
| 5,666,434 A | 9/1997 | Nishikawa et al. | |
| 5,668,888 A | 9/1997 | Doi et al. | |
| 5,673,332 A | 9/1997 | Nishikawa et al. | |
| 5,729,620 A | 3/1998 | Wang | |
| 5,729,662 A | 3/1998 | Rozmus | |
| 5,732,697 A | 3/1998 | Zhang et al. | |
| 5,740,266 A | 4/1998 | Weiss et al. | |
| 5,740,267 A | 4/1998 | Echerer et al. | |
| 5,740,268 A | 4/1998 | Nishikawa et al. | |
| 5,757,953 A | 5/1998 | Jang | |
| 5,761,334 A | 6/1998 | Nakajima et al. | |
| 5,768,333 A | 6/1998 | Abdel-Mottaleb | |
| 5,768,406 A | 6/1998 | Abdel-Mottaleb | |
| 5,769,074 A | 6/1998 | Barnhill et al. | |
| 5,799,100 A | 8/1998 | Clarke et al. | |
| 5,815,591 A | 9/1998 | Roehrig et al. | |
| 5,825,910 A | 10/1998 | Vafai | |
| 5,825,936 A | 10/1998 | Clarke et al. | |
| 5,832,103 A | * 11/1998 | Giger et al. | 382/130 |
| 5,857,030 A | 1/1999 | Gaborski et al. | |
| 5,872,859 A | 2/1999 | Gur et al. | |
| 5,917,929 A | 6/1999 | Marshall et al. | |
| 5,999,639 A | 12/1999 | Rogers et al. | |
| 6,014,452 A | 1/2000 | Zhang et al. | |
| 6,035,056 A | 3/2000 | Karssemeijer | |
| 6,075,879 A | 6/2000 | Roehrig et al. | |
| 6,091,841 A | 7/2000 | Rogers et al. | |
| 6,115,488 A | 9/2000 | Rogers et al. | |
| 6,137,898 A | 10/2000 | Broussard et al. | |
| 6,167,146 A | 12/2000 | Rogers et al. | |
| 6,198,838 B1 | 3/2001 | Roehrig et al. | |
| 6,205,236 B1 | 3/2001 | Rogers et al. | |
| 6,263,092 B1 | 7/2001 | Roehrig et al. | |
| 6,266,435 B1 | 7/2001 | Wang | |
| 6,301,378 B1 | 10/2001 | Karssemeijer et al. | |
| 6,320,976 B1 | 11/2001 | Murthy et al. | |
| 6,389,157 B2 | 5/2002 | Rogers et al. | |
| 6,404,908 B1 | 6/2002 | Schneider et al. | |
| 6,434,262 B2 | 8/2002 | Wang | |
| 6,553,356 B1 | 4/2003 | Good et al. | |

OTHER PUBLICATIONS

Ackerman, L.V., et al., "Breast Lesion Classification by Computer and Xeroradiograph," *Cancer,* vol. 30, No. 4, Oct. 1972, (pp. 1025–1035).

Haralick, R., et al., "Textural Features for Image Classification," *IEEE Transactions on Systems, Man, and Cybernetics,* vol. SMC–3, No. 6, Nov. 1973, (pp. 610–621).

Ballard, D., et al., "Tumor Detection in Radiographs," *Computers and Biomedical Research,* vol. 6, 1973, (pp. 299–321).

Ackerman, L.V., et al., "Classification of Benign and Malignant Breast Tumors on the Basis of 36 Radiographic Properties," *Cancer,* vol. 31, No. 2, 1973, (p. 138).

Chang, N–C., "Computer Characterization of Calcifications for Breast Cancer Detection—A Feasibility Study," Master's Thesis, Department of Electrical Engineering, University of Cincinnati, 1973.

Wes, Ph.D., W.G. "Evaluation of Mammographic Calcifications Using a Computer Program," Work in Progress, *Radiology,* vol. 116, Sep. 1975, (pp. 717–720).

Kimme, C., et al., "Automatic Detection of Suspicious Abnormalities in Breast Radiographs," *Data Structures, Computer Graphics and Pattern Recognition,* 1975, (pp. 427–447).

Ting, Y.C., "A Computer Pattern Recognition System for Breast Cancer Detection," Master's Thesis, University of Cincinnati, 1975.

Millis, R.R., et al., "The Detection and Significance of Calcifications in the Breast: A Radiological and Pathological Study," *British Journal of Radiology,* vol. 49, No. 577, Jan. 1976, (pp. 12–26).

Spiesberger, W., et al., "Outlining of Microcalcifications by Computer–Assisted Mammogram Inspection," *Medicamundi,* vol. 22, No. 3, 1977, (pp. 32–34).

Spiesberger, W., "Mammogram Inspection by Computer," *IEEE Transactions on Biomedical Engineering,* vol. BME–26, No. 4, Apr. 1979, (pp. 213–219).

Kimme–Smith, C., et al., "Toward Reliable Measurements of Breast Parenchymal Patterns," *Proceedings of Sixth Conference on Computer Applications in Radiology and Computer–Aided Analysis of Radiology Images,* Jun. 1979, (pp. 118–121).

Hand, W., et al., "Computer Screening of Xeromammograms: A Technique for Defining Suspicious Areas of the Breast," *Computers and Biomedical Research,* vol. 12, 1979, (pp. 445–460).

Fox, S.H., et al., "A Computer Analysis of Mammographic Microcalcifications: Global Approach," *Proceedings of the IEEE 5th International Conference on Pattern Recognition,* 1980, (pp. 624–631).

Semmlow, J.L., et al., "A Fully Automated System for Screening Xeromammograms," *Computers and Biomedical Research,* vol. 13, 1980, (pp. 350–362).

Dhawan, A.P., et al., "Enhancement of Mammographic Features by Optimal Adaptive Neighborhood Image Processing," *IEEE Transactions on Medical Imaging,* vol. MI–5, No. 1, Mar. 1986, (pp. 8–15).

Dhawan, A.P., et al., Correction to "Enhancement of Mammographic Features by Optimal Adaptive Neighborhood Image Processing," *IEEE Transactions on Medical Imaging,* vol. MI–5, No. 2, Jun. 1986, (p. 120).

Bhanu, B., "Automatic Target Recognition: State of the Art Survey," *IEEE Transactions on Aerospace and Electronic Systems,* vol. AES–22, No. 4, Jul. 1986, (pp. 364–379).

Metz, Ph.D., C.E., "ROC Methodology in Radiologic Imaging," *Investigative Radiology,* vol. 21, No. 9, Sep. 1986 (pp. 720–733).

Lippmann, R.P., "An Introduction to Computing with Neural Nets," *IEEE ASSP Magazine,* vol. 96, Apr. 1987 (pp. 4–22).

Chan, H–P, et al., "Image Feature Analysis and Computer–Aided Diagnosis in Digital Radiography. I. Automated Detection of Microcalcifications in Mammography," *Med. Phys.,* vol. 14, No. 4, Jul./Aug. 1987, (pp. 538–548).

Kahn, E., et al., "Computer Analysis of Breast Calcifications in Mammographic Images," *Proceedings of the International Symposium on Computer Assisted Radiology '87,* Lemke, U., et al., editors, 1987, (pp. 729–733).

Chan, H–P, et al., "Original Investigations: Computer–Aided Detection of Microcalcifications in Mammograms—Methodology and Preliminary Clinical Study," *Investigative Radiology,* vol. 23, No. 7, Jul. 1988, (pp. 664–671).

Fam, B.W., et al., "Algorithm for the Detection of Fine Clustered Calcifications on Film Mammograms," *Radiology,* vol. 169, No. 1, Oct. 1988, (pp. 333–337).

Fam, B.W., et al., "The Detection of Calcification Clusters in Film–Screen Mammograms; A Detailed Algorithmic Approach" *Medical Imaging II,* vol. 914, 1988, (pp. 620–634).

Dhawan, A.P., et al., "Mammographic Feature Enhancement by Computerized Image Processing," *Computer Methods and Programs in Biomedicine,* vol. 27, 1988, (pp. 23–35).

Davies, D.H., et al., "Automatic Detection of Microcalcifications in Digital Mammograms Using Local Area Thresholding Techniques," *SPIE's Conference on Medical Imaging III Image Processing,* vol. 1092, Newport Beach, CA, Jan. 31–Feb. 3, 1989, (pp. 153–159).

Lai, S.M., et al., "On Techniques for Detecting Circumscribed Masses in Mammograms," *IEEE Transactions on Medical Imaging,* vol. 8, No. 4, Dec. 1989, (pp. 377–386).

Davies, D.H., et al., "Automatic Detection of Clusters of Calcifications in Digital Mammograms," *Proceedings of the International Symposium on Computer Assisted Radiology,* Lemke, H.U., et al., editors, 1989, (pp. 180–184).

Ayer, K.W. et al., "Forward Looking Infrared Image Segmentation and Pattern Recognition Using Gabor Transform and Joint Transform Correlation Techniques," Wright Laboratories, Air Force Institute of Technology, Technical Report, Mar. 1990.

Davies, D.H., et al., "Automatic Computer Detection of Clustered Calcifications in Digital Mammograms," *Phys. Med. Biol.,* vol. 35, No. 8, Apr. 1990, (pp. 1111–1118).

Boone, J.M., et al., "Neural Networks in Radiologic Diagnosis," *Investigative Radiology,* vol. 25, No. 9, Sep. 1990, (pp. 1012–1016).

Brzakovic, D., et al., "An Approach to Automated Detection of Tumors in Mammograms" *IEEE Transactions on Medical Imaging,* vol. 9, No. 3, Sep. 1990, (pp. 233–241).

Rogers, S.K., et al., *An Introduction to Biological and Artificial Neural Networks,* Oct. 23, 1990, (pp. 47–61).

Chan, Ph.D., H–P, et al., "Improvement in Radiologists' Detection of Clustered Microcalcifications on Mammograms—The Potential of Computer–Aided Diagnosis," *Investigative Radiology,* vol. 25, No. 10, Oct. 1990, (pp. 1102–1110).

Veronin, C.P., et al., "An Optical Image Segmentor Using Wavelet Filtering Techniques as the Front End of a Neural Network Classifier," *SPIE's International Conference on Applications of Artificial Neural Networks,* vol. 1469, Apr. 1991, (pp. 281–291).

Lau, T.K., et al., "Automated Detection of Breast Tumors Using the Asymmetry Approach," *Computers and Biomedical Research,* vol. 24, No. 3, Jun. 1991, (pp. 273–295).

Yin, F.F., et al., "Computerized Detection of Masses in Digital Mammograms: Analysis of Bilateral Subtraction Images," *Med. Phys.,* vol. 18, No. 5, Sep./Oct. 1991, (pp. 955–963).

Zhang, W., et al., "Image Processing of Human Corneal Endothelium Based on a Learning Network," *Applied Optics,* vol. 30, No. 29, Oct. 10, 1991, (pp. 4211–4217).

Laing, J., et al., "Gabor and Multiresolution Wavelet Decomposition Analysis of the Kanisza Triangle Illusion," for Wright Lab Target Recognition Group, Nov. 1991.

Kimme–Smith, Ph.D., C., "New and Future Developments in Screen–Film Mammography Equipment and Techniques," *Radiologic Clinics of North America,* vol. 30, No. 1, Jan. 1992, (pp. 55–66).

Veronin, C.P., et al., "Optical Image Segmentation Using Neural–Based Wavelet Filtering Techniques," *Optical Engineering,* vol. 31, No. 2, Feb. 1992, (pp. 287–294).

Wu, Y., et al., "Computerized Detection of Clustered Microcalcifications in Digital Mammograms: Applications of Artificial Neural Networks," *Medical Physics,* vol. 19, No. 3, May/Jun. 1992, (pp. 555–560).

Ng, S.L., et al., "Automated Detection and Classification of Breast Tumors," *Computers and Biomedical Research,* vol. 25, 1992, (pp. 218–237).

Dhawan, A.P., et al., "Artificial Neural Network Based Classification of Mammographic Microcalcifications Using Image Structure Features," *Proceedings of SPIE's Conference on Biomedical Image Processing and Biomedical Visualization,* San Jose, vol. 1905, Feb. 1–4, 1993, (pp. 820–831).

Wu, Y., et al., "Artificial Neural Networks in Mammography: Application to Decision Making in the Diagnosis of Breast Cancer," *Radiology,* vol. 187, No. 1, Apr. 1993, (pp. 81–87).

Woods, K.S., et al., "Comparative Evaluation of Pattern Recognition Techniques for Detection of Microcalcifications in Mammography," *Computerized Medical Imaging and Graphics,* vol. 16, No. 5, May 1993, (pp. 1417–1436).

Fletcher, S.W., et al., "Report of the International Workshop on Screening for Breast Cancer," *Journal of the National Cancer Institute,* vol. 85, No. 20, Oct. 20, 1993, (pp. 1644–1656).

Anand, R., et al., "An Improved Algorithm for Neural Network Classification of Imbalanced Training Sets," *IEEE Transactions on Neural Networks,* vol. 4, No. 6, Nov. 1993, (pp. 962–969).

Dengler, J., et al., "Segmentation of Microcalcifications in Mammograms," *IEEE Transactions on Medical Imaging,* vol. 12, No. 4, Dec. 1993, (pp. 634–642).

Giger, Ph.D., M.L., "Computer–Aided Diagnosis," *RSNA Categorical Course in Physics 1993,* 1993, (pp. 283–298).

Nishikawa, R.M., et al., "Effect of Case Selection on the Performance of Computer–Aided Detection Schemes," *Med. Phys.,* vol. 21, No. 2, Feb. 1994, (pp. 265–269).

Yin, F.F., et al., "Computerized Detection of Masses in Digital Mammograms: Investigation of Feature–Analysis Techniques," *Journal of Digital Imaging*, vol. 7, No. 1, Feb. 1994, (pp. 18–26).

Kegelmeyer, Jr., Ph.D., W. P., et al., "Computer–Aided Mammographic Screening for Spiculated Lesions," *Radiology*, vol. 191, No. 2, May 1994, (pp. 331–337).

Barman, H., et al. "Feature Extraction For Computer–Aided Analysis of Mammograms," *State of the Art Digital Mammographic Image Analysis*, Boyer, K.W., et al., editors, 1994, (pp. 128–147).

Chitre, Y., et al., "Artificial Neural Network Based Classification of Mammographic Microcalcifications Using Image Structure Features," *State of the Art in Digital Mammographic Image Analysis*, Boyer, K.W., et al., editors, 1994, (pp. 167–197).

Giger, M.L., et al., "Computerized Characterization of Mammographic Masses: Analysis of Spiculation," *Cancer Letters*, vol. 77, 1994, (pp. 201–211).

Kegelmeyer, Jr., W.P., "Evaluation of Stellate Lesion Detection in a Standard Mammogram Data Set," *State of the Art in Digital Mammographic Image Analysis*, Boyer, K.W. et al., editors, 1994, (pp. 262–279).

Lidbrink, E.K., et al., "The General Mammography Screening Program in Stockholm: Organisation and First–Round Results," *Acta Oncologica*, vol. 33, No. 4, 1994, (pp. 353–358).

Nishikawa, R.M., "Computer–Aided Detection and Diagnosis of Masses and Clustered Microcalcifications from Digital Mammograms," *State of the Art in Digital Mammographic Image Analysis*, Boyer, K.W., et al., editors, 1994, (pp. 82–102).

Petrosian, A., et al., "Computer–Aided Diagnosis in Mammography: Classification of Mass and Normal Tissue by Texture Analysis," *Phys. Med. Biol.*, vol. 39, 1994, (pp. 2273–2288).

Shen, L., et al., "Detection and Classification of Mammographic Calcifications," *State of the Art in Digital Mammographic Image Analysis*, Boyer, K.W., et al., editors, 1994, (pp. 198–212).

Wilding, P., et al., "Application of Backpropagation Neural Networks to Diagnosis of Breast and Ovarian Cancer," *Cancer Letters*, vol. 77, 1994, (pp. 145–153).

Woods, K.S., et al., "Comparative Evaluation of Pattern Recognition Techniques for Detection of Microcalcifications in Mammography," *State of the Art in Digital Mammographic Image Analysis*, Boyer, K.W., et al., editors 1994, (pp. 213–231).

Chan, H–P, et al., "Computer–Aided Classification of Mammographic Masses and Normal Tissue: Linear Discriminant Analysis in Texture Feature Space," *Phys. Med. Biol.*, vol. 40, Feb. 1995, (pp. 857–876).

Hojjatoleslami, S.A., et al., "Automatic Detection of Calcification in Mammograms," 5th International Conference on Image Processing and Its Applications, vol. 410, Jul. 1995, (pp. 139–143).

Li, H.D., et al, "Markov Random Field for Tumor Detection in Digital Mammography," *IEEE Transactions on Medical Imaging*, vol. 14, No. 3, Sep. 1995, (pp. 565–576).

Huo Z., et al., "Analysis of Spiculation in the Computerized Classification of Mammographic Masses," *Med. Phys.*, vol. 22, No. 10, Oct. 1995, (pp. 1569–1579).

Bick, U., et al., "Automated Segmentation of Digitized Mammograms," *Academic Radiology*, vol. 2, 1995, (pp. 1–9).

Feig, M.D., S.A, et al., "Digital Mammography, Computer–Aided Diagnosis, and Telemammography," *Radiologic Clinics of North America*, vol. 33, No. 6, Nov. 1995, (pp. 1205–1230).

Zheng, B., et al., "Computerized Detection of Masses from Digitized Mammograms: Comparison of Single–Image Segmentation and Bilateral–Image Subtraction," *Academic Radiology*, vol. 2, No. 12, Dec. 1995, (pp. 1056–1061).

Tahoces, P.G., et al., "Computer–Assisted Diagnosis: The Classification of Mammographic Breast Parenchymal Patterns," *Phys. Med. Biol.*, vol. 40, 1995, (pp. 103–117).

McCandless, D.A., et al., "Wavelet Detection of Clustered Microcalcifications," *SPIE*, vol. 2762 (date unknown), (pp. 388 et seq.).

Braccialarghe, D., et al., "Contrast Enhancement of Mammographic Features: A Comparison of Four Methods," *Optical Engineering*, vol. 35, No. 1, Jan. 1996, (pp. 76–80).

Sahiner, B., et al., "Classification of Mass and Normal Breast Tissue: Feature Selection Using a Genetic Algorithm," *Colloqium on Digital Mammography*, Feb. 1996, (pp. 379–384).

Chang, Y–H, et al., "Computerized Identification of Suspicious Regions for Masses in Digitized Mammograms," *Investigative Radiology*, vol. 31, No. 3, Mar. 1996, (pp. 146–153).

Giger, Ph.D., M., et al., "Image Processing and Computer–Aided Diagnosis," *Radiologic Clinics of North America*, vol. 34, No. 3, May 1996, (pp. 565–596).

Kocur, C.M., et al., "Using Neural Networks to Select Wavelet Features for Breast Cancer Diagnosis," *IEEE Engineering in Medicine and Biology*, May/Jun. 1996, (pp. 95–102).

Dhawan, A.P., et al., "Analysis of Mammographic Microcalcifications Using Gray–Level Image Structure Features," *IEEE Transactions on Medical Imaging*, vol. 15, No. 3, Jun. 1996, (pp. 246–259).

Pohlman, S., et al., "Quantitative Classification of Breast Tumors in Digitized Mammograms," *Med. Phys.*, vol. 23, No. 8, Aug. 1996, (pp. 1337–1345).

Chang, Y–H., "Robustness of Computerized Identification of Masses in Digitized Mammograms," *Investigative Radiology*, vol. 31, No. 9, Sep. 1996, (pp. 563–568).

Cooley, T.R., "An Automated System for the Classification of Mammograms," Ph.D. Dissertation, Rutgers, the State University of New Jersey, Oct. 1996.

Petrick, N., et al., "Automated Detection of Breast Masses on Mammograms Using Adaptive Contrast Enhancement and Texture Classification," *Med. Phys.*, vol. 23, No. 10, Oct. 1996, (pp. 1685–1696).

Sahiner, B., et al., "Image Feature Selection by a Genetic Algorithm: Application to Classification of Mass and Normal Breast Tissue," *Med. Phys.*, vol. 23, No. 10, Oct. 1996, (pp. 1671–1684).

Bick, U., et al., "Density Correction of Peripheral Breast Tissue on Digital Mammograms," *RadioGraphics*, vol. 16, No. 6, Nov. 1996, (pp. 1403–1411).

Ochoa, E.M., "Clustered Microcalcification Detection Using Optimized Difference of Gaussians," Master's Thesis, Department of the Air Force, Air University, Air Force Institute of Technology, Dec. 1996.

Zheng, B., et al., "On the Reporting of Mass Contrast in CAD Research," *Med. Phys.*, vol. 23, No. 12, Dec. 1996, (pp. 2007–2009).

Chen, L., et al., "Morphological Filtering and Multiresolution Fusion for Mammographic Microcalcifications Detection," Proceedings of SPIE's Conference on Image Processing, Newport Beach, vol. 3034, Feb. 25–28, 1997, (pp. 938–947).

Freedman, M., et al., "Classification of False Positive Findings on Computer Aided Detection of Breast Microcalcifications," Proceedings of SPIE's Conference on Image Processing, Newport Beach, vol. 3034, Feb. 25–28, 1997, (pp. 853–859).

Gavrielides, M.A., et al., "Automatic Shape Analysis and Classification of Mammographic Calcifications," Proceedings of SPIE's Conference on Image Processing, Newport Beach, vol. 3034, Feb. 25–28, 1997, (pp. 869–876).

Li, H., et al., "Mammographic Mass Detection by Stochastic Modeling and a Multi–Modular Neural Network," Proceedings of SPIE's Conference on Image Processing, Newport Beach, vol. 3034, Feb. 25–28, 1997, (pp. 480–490).

Sahiner, B., et al., "Characterization of Masses on Mammograms: Significance of the Use of the Rubber–Band Straightening Transform," Proceedings of SPIE's Conference on Image Processing, Newport Beach, vol. 3034, Feb. 25–28, 1997 (pp. 491–499).

Wu, C.Y., et al., "Image Feature Analysis for Classification of Microcalcifications in Digital Mammography: Neural Networks and Genetic Algorithms," Proceedings of SPIE's Conference on Image Processing, Newport Beach, vol. 3034, Feb. 25–28, 1997 (pp. 501–509).

Zheng, Y., et al., "Reducing Breast Biopsies by Ultrasonographic Analysis and a Modified Self–Organizing Map," Proceedings of SPIE's Conference on Image Processing, Newport Beach, vol. 3033, Feb. 25–28, 1997 (pp. 384–391).

Rogers, S.K., "Introduction to Artificial Neural Networks," *Fundamentals of Artificial Neural Networks*, Apr. 1997, (pp. 1–41).

Zheng, Y., et al., "Reduction of Breast Biopsies with a Modifed Self–Organizing Map," *IEEE Transactions on Neural Networks*, vol. 8, No. 6, Nov. 1997, (pp. 1386–1396).

Anastasio, M.A., et al., "Optimization and FROC Analysis of Rule–Based Detection Schemes Using a Multiobjective Approach," Correspondence in *IEEE Transactions on Medical Imaging*, Aug. 26, 1998.

\* cited by examiner

METHOD FOR DETERMINING FEATURES FROM DETECTIONS IN A DIGITAL IMAGE USING A BAUER-FISHER RATIO

CROSS-REFERENCE TO RELATED APPLICATIONS

This application is a divisional of U.S. application Ser. No. 09/602,762, filed Jun. 23, 2000, which claims the benefit of U.S. Provisional Application No. 60/140,636, filed Jun. 23, 1999, which is incorporated herein by reference.

BACKGROUND OF THE INVENTION

1. Field of the Invention

The present invention relates to a method and system for computer aided analysis of detections on digital images and, more particularly, to a method and system for assisting radiologists in reading medical images.

2. Related Prior Art

Computer aided detection (CAD) systems for mammography have been advocated for several decades. The objective of any medical CAD system is to indicate tissue regions that need a physician's attention while leaving normal tissue unmarked. Current systems use one or possibly two image inputs to detectors. If two images are input to a detector, the methods fall into one of two approaches.

The first approach is known as bilateral subtraction. In this method, the left and right breast images are subtracted to produce a difference image. Since cancer is typically unilateral and since bodies are relatively symmetric, in many cases the difference image emphasizes cancerous regions. The second approach is similar to bilateral subtraction. However, in this case, a temporal subtraction is performed wherein the same view of a body part taken at an earlier time is subtracted from the current image. This temporal subtraction is intended to highlight regions that have changed during the time interval between imaging sessions.

Both approaches can increase sensitivity of a detector, but suffer from two problems. First, the number of false indications is increased by the subtraction. Second, the images involved in the subtraction process must first be aligned. Alignment is not trivial since tissue is elastic. Therefore, the alignment method must compensate for translation, rotation, scale, and spatially dependent stretching.

The approach in this invention provides significant improvement relative to single image based detection methods. Furthermore, the CAD system described in this application exploits the information available from the entire set of images associated with a patient's screening mammography session, without requiring image subtraction or alignment.

SUMMARY OF THE INVENTION

The present invention provides a computer aided detection method and system to assist radiologists in the reading of medical images.

In a first step, a set of digital mammogram images is obtained, such as from mammograms obtained from a patient's screening visit. A rectangular analysis region containing breast tissue is segmented from each digital mammogram image, and a binary mask corresponding to the breast tissue is created.

Clustered microcalcifications are detected in a microcalcification detection step. Point features from each microcalcification are applied to a classifier trained to pass microcalcifications representative of malignant clusters. Those microcalcifications remaining after the classifier are represented by their centroid location and subsequently grouped into clusters. Features are computed from the clusters and each is subsequently assigned a class label and a quality score.

Densities are detected in a density detection step. In this step, a subsampled image is applied to a bank of DoG filters to produce an image with enhanced local bright spots. This image is then thresholded and the thresholded image is input to a screening classifier. Detections passing the screening classifier as suspicious are input to a region growing step and density features are computed from the region grown area. Detections are input to a density classification step, the output of which includes computed features, a class label, and two quality scores for each detection.

Detections, including both microcalcifications and densities, are further analyzed in a post processing stage. In a first post processing step, the detections across all the images in the case are considered collectively by case based ranking. In a second post processing step, within each image, the collection of detections across detection category are assigned to one of 29 image context categories based on associated quality scores. When certain image context categories of detections are observed on an image, all the detections on that image are removed. In the third post processing step, the remaining detections across all the images in the case are considered within microcalcification and density detection categories. Within each detection category, "normalcy" features are computed using the quality scores from all the detections in the case from that category. These normalcy features are applied to a classification stage designed to assign the entire case as "Normal" or "Not Normal". When the classifier assigns the case as "Normal", all detections of the corresponding category, microcalcification or density, are removed from the images in that case. The final output of the system is a set of indications which is displayed overlaid on the set of digital images.

It should be noted that the present method and system is in contrast to subtraction-based methods proposed by the prior art in that such prior art methods are inherently limited to two input images, whereas the present invention performs analysis of detections extending across a set of images for a patient, such as a set of four images forming a case for the patient. By exploiting the information available from the entire set of images associated with a patient's screening mammography session, the approach of the present invention provides significant improvement in accomplishing the objectives of obtaining both increased system sensitivity and reduction of false positive detections.

Other objects and advantages of the invention will be apparent from the following description, accompanying drawings and the appended claims.

DETAILED DESCRIPTION OF THE PREFERRED EMBODIMENT

Figure 1:
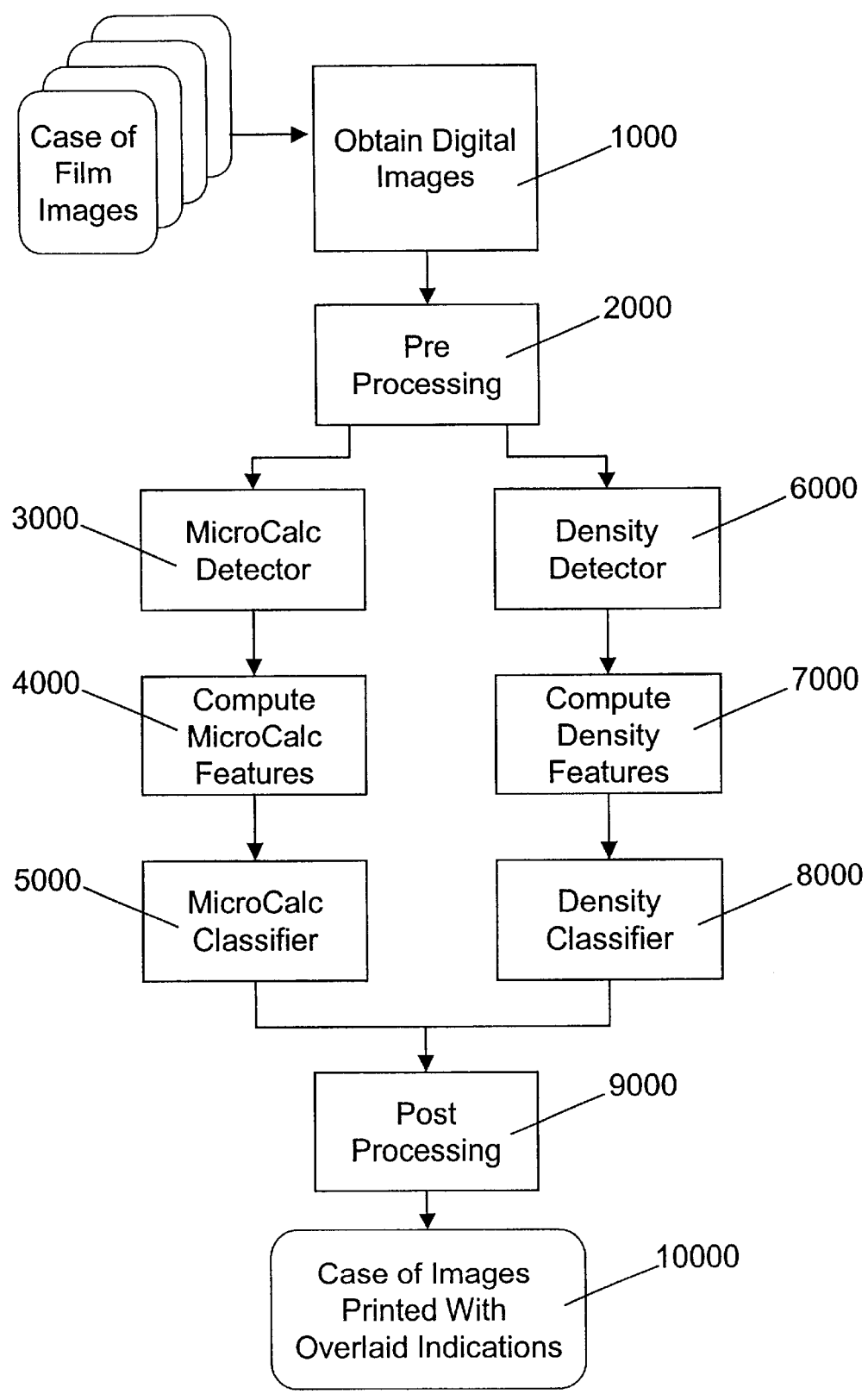
FIG. 1 is a flow diagram illustrating the automated method for the detection of masses and clustered microcalcifications in digital mammograms.

Referring now to the drawings, wherein like reference numerals designate identical or corresponding parts through the several views, and more particularly to FIG. 1 thereof, there is shown a flow diagram generally illustrating a sequence of steps performed in order to detect the locations of clusters of microcalcifications and densities within a set of digital mammograms obtained from the screening views associated with a patient's screening mammography session.

In a first step 1000, a set of digital mammograms is obtained using hardware such as digital mammography systems, or by digitizing mammography films using laser or charge-coupled device (CCD) digitizers.

In a preprocessing step, 2000, a rectangular analysis region containing breast tissue is segmented from the digital mammogram image to decrease the time required for processing the mammogram images. A binary mask corresponding to the breast tissue, a "breast mask", is created for use in later processing steps. The breast mask is used to limit detections to areas of the image containing breast tissue. The preprocessing step 2000 also produces a subsampled version of the input image. The subsampled image is input to a subsequent processing stage. Since the subsampled image has significantly fewer pixels to process, the time required to analyze the subsampled image is much less than for the original input image. The preprocessing stage also creates a binary pectoral mask corresponding to tissue of the pectoral muscle. The pectoral mask may be used to suppress detections in the pectoral region.

Clustered microcalcifications are detected in a microcalcification detection step 3000. After filtering the cropped image with a difference of Gaussians (DoG) filter to enhance the microcalcifications, the resultant image is thresholded to detect microcalcifications. Detections near the breast edge, as well as those not in the breast mask, are removed and "point" features are computed from individual microcalcification detections. The point features from each microcalcification are applied to a classifier trained to pass microcalcifications representative of malignant clusters. Those microcalcifications remaining after the classifier are represented by their centroid location and subsequently grouped into clusters. "Cluster" features are computed from the clusters of microcalcifications in step 4000. Detected clusters are assigned class labels, '1' or '0' for either suspicious or non-suspicious, in a classification step 5000. The output of the microcalcification classification stage includes the computed features, the class label, and a quality score for each detected region.

Densities are detected in a density detection step 6000. The input to this step is the subsampled image from the preprocessing stage. After first processing the image to reduce false detections associated with the skin edge boundary, locally bright densities are emphasized by trend correction. The trend corrected image is then applied to a bank of DoG filters. The filter bank outputs are nonlinearly combined to produce an image with further enhanced densities. This image is thresholded in a peak detection step and the resultant groups of pixels are grouped into connected objects and the breast mask is applied. These objects and the image pixels from the original images and the filter bank output images are used to create "density screening" features. These density screening features are input to a density screening classifier used to label the detected objects as suspicious or non-suspicious. Objects passing the screening classifier as suspicious are input to a region growing step which estimates the shape of the detected locally bright spot.

In step 7000, density features are computed from the region grown area using the subsampled input image and the filter bank outputs. An expert filter step removes certain detections by comparing density features from the region grown areas to thresholds. Detections with density feature values beyond the thresholds are removed from further consideration. Subsequent to the expert filter stage, detections are assigned class labels, '1' or '0' for either suspicious or non-suspicious, in the density classification step, 8000. The output of the density classification stage includes the computed features, the class label, and two quality scores for each detected region, corresponding to the categories of "mass" and "spiculated mass". The word "density" applies to both types of masses.

Class labels and quality scores for the detected microcalcification and density regions are further analyzed in a post processing step, 9000. During this step, the detections are considered in two fundamentally different ways than in the preceding steps; across all images in the case and across microcalcification and density detection categories. Only detections with class labels of '1' at the end of the post processing steps are displayed at the output of the system.

In a first post processing step, the detections across all the images in the case are considered collectively by case based ranking. Case based ranking limits the number of microcalcification and density detections with class labels of '1' to predetermined maximum numbers per case and per image using the quality scores associated with each detection.

In a second post processing step, within each image, the collection of detections across microcalcification and density detection categories are assigned to one of 29 image context combinations based on associated quality scores. When certain image context combinations of detections are observed on an image, all the detections on that image have their class labels set to '0'.

In a third post processing step, all detections across all the images in the case, with class labels of '1' or '0', are considered within microcalcification and density detection categories. Within each detection category, "normalcy" features are computed using the quality scores from all the detections in the case from that category. These normalcy features are applied to a classification stage designed to assign the entire case as "Normal" or "Not Normal". When the classifier assigns the case as "Normal", all detections of the corresponding category, microcalcification or density, have their class labels set to '0' across all the images in that case.

In a final step 10000, the detections with class labels of '1' are displayed overlaid on the set of digital images as "Indications".

Classifier Design

This invention uses pattern recognition subsystems throughout the processing stages. This section provides an overview to the areas of pattern recognition and classifier design as they apply to this invention.

Pattern recognition is the process of making decisions based on measurements. In this system, suspicious regions or detections are located by a detector, and ultimately accepted or rejected for display. For maximum sensitivity, the detector is designed to locate many regions that may be malignant. This leads to the detection of many regions that are normal. The purpose of the pattern recognition subsystems is to remove as many of the false detections as possible while simultaneously retaining as many of the truly malignant detections as possible. A detection corresponding to a cancerous region is referred to as a "true positive" detection, or simply, a TP. Similarly, a detection corresponding to a normal region is known as a "false positive" detection, or an FP.

The first step in the process is to characterize the detections. Toward this end, multiple measurements are computed from each of the detected regions. Each measurement is referred to as a feature. The collection of measurements for that detected region is referred to as its feature vector, wherein each element of the vector represents a feature value The second step in the process is to use the information in the feature vectors to assign the detection a quality score or possibly a class label. The feature vectors from a detector are provided as inputs to a classifier, which computes a number for a given feature vector input. One method to specify a classifier is by a set of discriminant functions.

Figure 2:
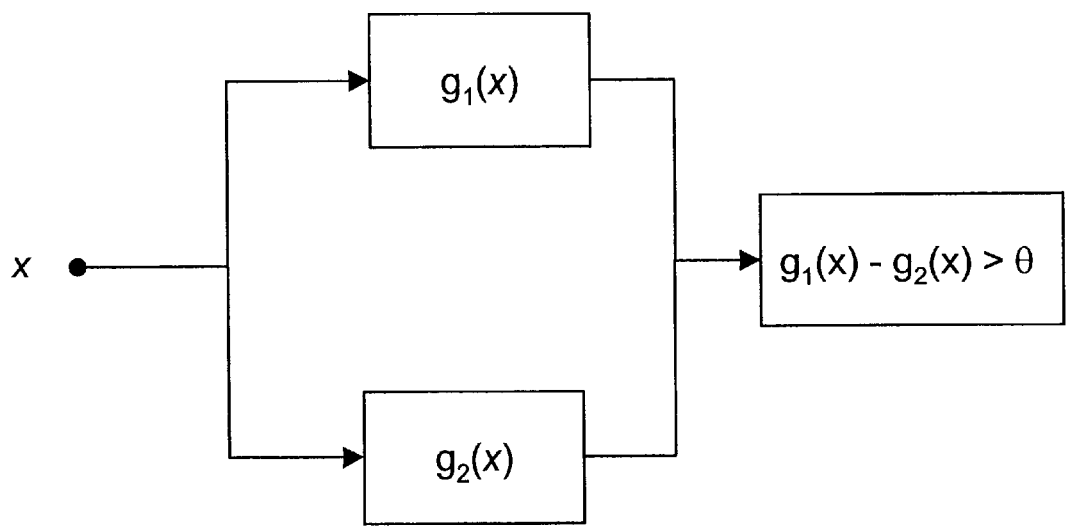
FIG. 2 is flow diagram of a general classifier architecture.

A discriminant function computes a single value as a function of an input feature vector. Referring to FIG. 2, a classifier is shown having a feature vector x applied to a set of discriminant functions, $\{g_i(x)\}$, i=1,2. The classifier shown in FIG. 2 uses one discriminant function per class. The output value of a discriminant function is referred to as a discriminant. The discriminants are subtracted and compared to a threshold value, $\theta$. If the difference of discriminants is greater than the threshold, the class label is set to '1', otherwise the class label is set to '0'.

Many methods are available for designing discriminant functions. In the preferred embodiment of the invention, the method for designing the discriminant functions is a statistical approach providing quadratic discriminant functions. Under certain general conditions, quadratic discriminant functions can provide the minimum average probability of error. Design of quadratic discriminant functions begins with labeled training data.

Labeled training data were generated in the following manner. A collection of mammographic images were examined by certified radiologists to confirm regions of cancer based on pathological analysis of biopsied cells from that region. Truth data were generated by the radiologists marking truth boxes over the corresponding digital image regions associated with the cancer. Categories of cancer corresponding to microcalcification, mass, and spiculated mass are identified. These images were then processed to produce a plurality of feature vectors, a subset of which were associated with the truth boxes. Feature vectors from detections within the truth boxes receive the truth label of '1', while those outside are labeled as '0'.

In this invention the classes are ultimately cancer and not cancer. For each class to be identified, the mean and covariance matrices are computed from the labeled feature vectors of the training data. The quadratic classifier discriminant functions are given by $$G_i(X)=(X-M_i)^T\Sigma_i^{-1}(X-M_i)+\beta_i \qquad (1)$$

where X is the feature vector, $M_i$ is the class i mean and $\Sigma_i$ is the class i covariance matrix. The quantity $\beta_i$ is a bias term which can be modified to fine tune the decision process.

The discriminant function, $G_i(x)$, is a distance function; therefore small discriminants indicate a high probability that the observation belongs to class i. Consider the difference of discriminants calculated as $$\text{Delta}_i=G_0(X)-G_i(X) \qquad (2)$$

where the difference of discriminants is referred to as a delta discriminant. Let the not cancer class be class i=0 and the cancer class be i≠0. Then when $\text{Delta}_i$ is greater than zero implies that the feature vector X is closer to the cancer category than the not cancer category. Therefore, if $\text{Delta}_i>0$ for any i≠0, then the observation is considered to be a cancer. Furthermore, the greater the difference of discriminants, the higher the quality of the detection may be considered. For this reason, the difference of discriminants may be used as a quality score.

The quadratic classifier is an optimal classification technique when the features, X, have a Gaussian statistical distribution. If the distribution of an individual measurement is from some other form of a gamma distribution, a power transformation of the feature value can modify the distribution to more closely approximate a Gaussian distribution. This is performed by raising the individual feature values to the power of 0.4, $y=x^{0.4}$.

Preprocessing

Figure 3:
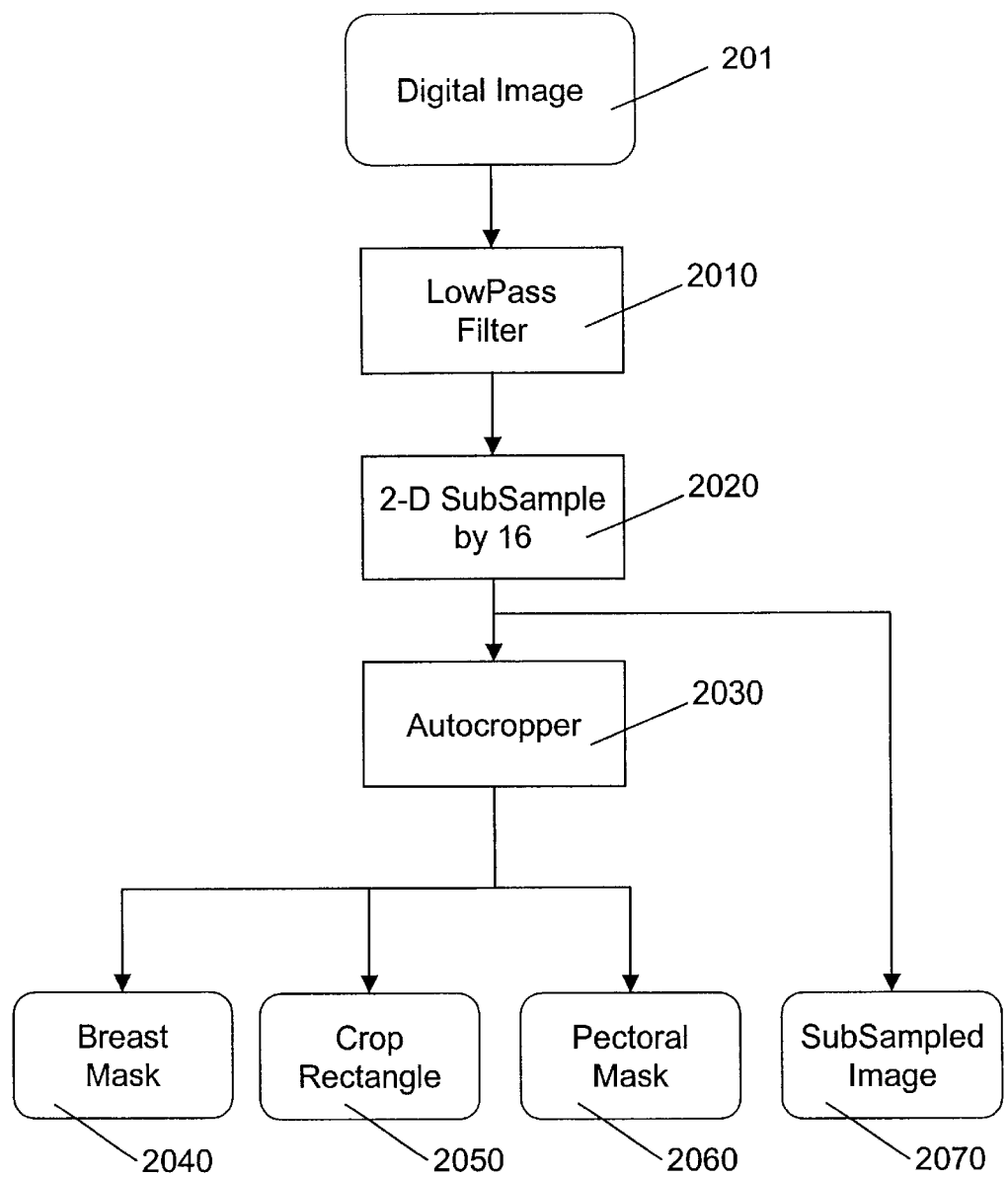
FIG. 3 is a flow diagram of the preprocessing operations.

As may be seen in FIG. 3, in the preprocessing step 2000 (FIG. 1) a digital mammogram image 201 is first low pass filtered in step 2010 and subsequently decimated by a factor of 16 in the horizontal and vertical dimensions in step 2020. The above operations provide a reduced resolution image, 2070, suitable for subsequent steps that do not require full spatial resolution. The reduced resolution image is referred to as a subsampled image. The subsampled image is input to the autocropper, 2030.

The autocropper produces a binary mask, 2040, known as a Breast Mask, identifying the location of breast tissue in the image. Focusing subsequent processing of the image on only that portion of the image that contains breast tissue reduces the time required to process the image. Also, other items appearing on the film, such as labels and patient information are excluded from considerations, and false positive indications lying outside of the breast tissue area are eliminated.

Autocropping is described in detail in U.S. Pat. No. 5,999,639, which patent is incorporated herein by reference. In the preferred embodiment, the autocropper creates a Crop Rectangle, 2050. The crop rectangle is a rectangular region exactly containing the breast mask.

A further output of the preprocessing stage is a Pectoral Mask, 2060. The pectoral mask is a binary mask identifying the location of pectoral muscle tissue in the image, and methods for forming pectoral masks are known in the art. It is desirable to inhibit these detections in the pectoral muscle because cancer only infrequently occurs in the pectoral muscle. Furthermore, this portion of the digital mammogram is usually brighter than the other regions, which can cause false positive detections. Thus, inhibiting detections in the pectoral muscle improves the performance of the system of the present invention.

Detection of Clustered Microcalcifications

Figure 4:
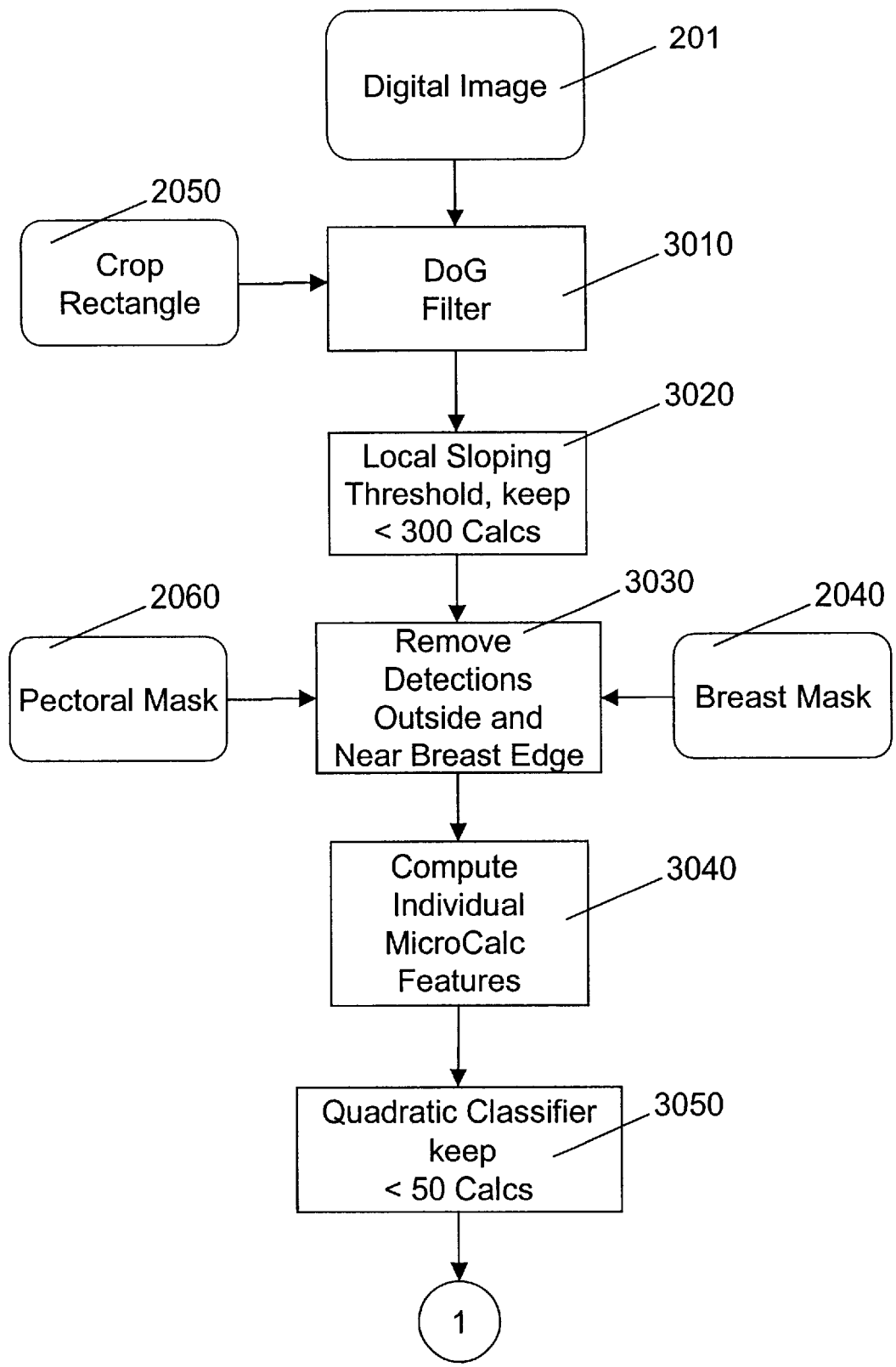
FIGS. 4–5 is a flow diagram of the clustered microcalcification detector.
Figure 5:
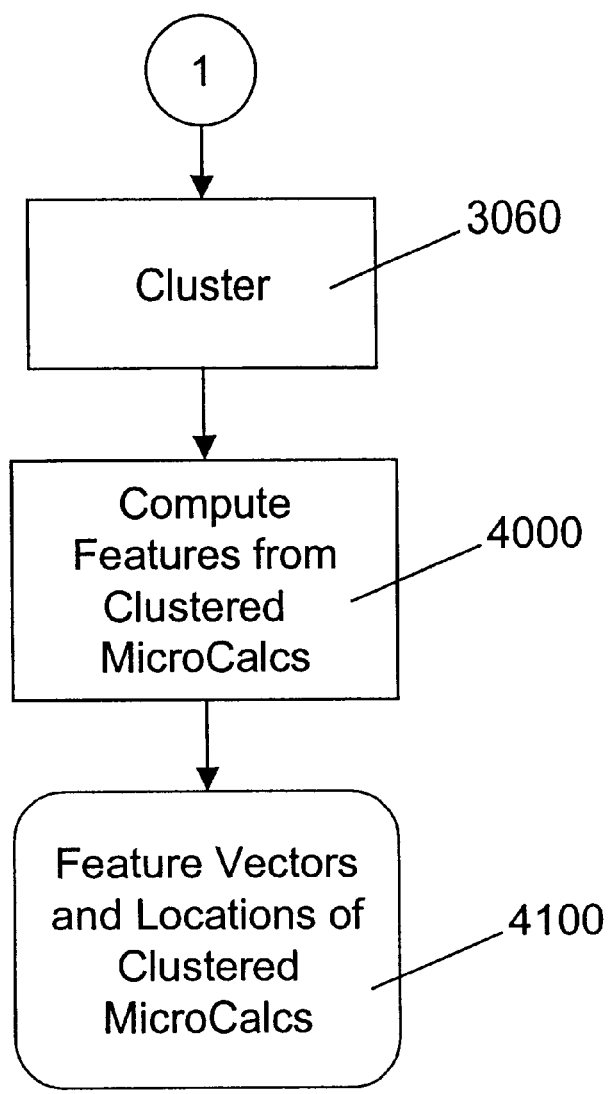

Turning now to FIGS. 4 and 5, where FIG. 5 is a continuation of FIG. 4, there is seen therein a flow diagram illustrating in detail the clustered microcalcification detection and clustered microcalcification feature computation systems 3000 and 4000 of the invention. The digital image 201 and the crop rectangle 2050 are input to a DoG filtering step 3010 to accentuate subimage areas containing locally bright spots of the size range of microcalcifications, thus creating local maxima in the filtered image. The DoG-filtered image is then thresholded in step 3020 to segment the maxima that represent detections of microcalcifications. The coordinate representations of the detected maxima are compared with the binary breast mask 2040 and pectoral mask 2060 to remove false detections outside the breast area and within but near the breast edge in step 3030. The remaining coordinate representations in the analysis area are subjected to a point feature computation step 3040 wherein measurements from individual microcalcifications are calculated. These point features are input to a quadratic classifier step 3050 designed to retain up to a predetermined number of detections most characteristic of individual microcalcifications associated with cancerous lesions. The retained detections are clustered in step 3060. Microcalcification cluster features are computed for the clusters in a feature computation step 4000, producing microcalcification cluster feature vectors and locations of clustered microcalcifications, 4100.

A more detailed discussion of the steps in the clustered microcalcification detection process follows. The digital image is first filtered with a DoG kernel to enhance microcalcifications. The DoG kernel is defined in an N by N square array of values. In the preferred embodiment, the kernel is 77 by 77. Filtering is accomplished by convolving the input image with the DoG kernel. In an alternative embodiment, filtering is accomplished by first obtaining the fast Fourier transforms (FFTs) of the input image and the DoG kernel, then multiplying the FFTs together, and taking the inverse FFT as the result.

The DoG kernel is applied here as an optimal detector of individual microcalcifications as described in U.S. Pat. No. 5,999,639. The DoG kernel is mathematically expressed as $$DoG(x, y) = c_1 \exp\left\{-\frac{1}{2}\frac{(x^2+y^2)}{\sigma_1^2}\right\} - c_2 \exp\left\{-\frac{1}{2}\frac{(x^2+y^2)}{\sigma_2^2}\right\} \quad (3)$$

where
$\sigma_1$ and $\sigma_2$ are standard deviations of individual Gaussian kernels and $c_1$ and $c_2$ are normalizing constants for Gaussian kernels.

Optimal values for $\sigma_i$ are detailed in U.S. Pat. No. 5,999,639. When $\sigma_2=1.6\sigma_1$, then the DoG filter's response closely matches the response of human spatial receptive filters. Therefore, with motivation from human physiology, let the ratio of the DoG standard deviation constants be 1 to 1.6. Then, for a target with average diameter of t pixels, use $\sigma_2=t/2$. From the rule of thumb, $\sigma_1=\sigma_2/1.6$ After DoG-filtering to accentuate the target relative to the background, the filtered image contains differences in gray levels between microcalcifications and background. Although microcalcifications tend to be among the brightest object in DoG-filtered images, they may exist within regions of high average gray levels and thus be difficult to reliably segment. The thresholding process used in one embodiment of the invention that generally addressees these concerns involves the local sloping threshold detailed in U.S. Pat. No. 5,999,639.

This thresholding is computed in the neighborhood of the set of detections as $$T(x,y)=A+B\mu(x,y)+C\sigma(x,y) \quad (4)$$

Consider the pixel values in the DoG filtered image to be represented as d(x,y). Each pixel is compared to the threshold value T(x,y). The result of thresholding is a locally thresholded image, 1_s(x,y). Pixels in 1_s(x,y) are set to '1' where values of d(x,y) are greater than T(x,y), and set to '0' elsewhere. This creates objects in the thresholded image. A predetermined number of detections are retained based on the difference between the brightest image pixel at locations of '1's in the object and the threshold value at that location.

After thresholding, detections are converted to single-pixel representations by computing the centroid or center of gravity of the objects found by the thresholding process. Detections are thus represented as single pixels with a value of logical '1' while the remaining pixels have a value of logical '0'. Objects with centroids less than a predetermined distance from the breast edge are rejected to reduce the false positive detections occurring due to the discontinuity in brightness values between the breast and background.

Calcifications associated with malignancies have certain characteristics in common; these traits may be exploited during the distinction of regions likely to be from microcalcifications typical of cancerous regions from those microcalcifications or false detections that are not of concern. The separation of individual microcalcification detections is accomplished by first computing point features from each detection, then applying the subsequent point feature vectors to a point classifier. A preferred embodiment of the classifier is a quadratic classifier.

The number of false positive microcalcification detections are reduced by a point classifier, detailed below. Point features are extracted for each microcalcification at location (x,y) as described. The three point features computed for each of the microcalcifications in a preferred embodiment are:

1. The response of the target size 13 (t=13) DoG kernel (N×N) centered at (x,y), where in a preferred embodiment, N=77.
2. The local mean of the target size 7 (t=7) DoG filtered image about (x,y), where in a preferred embodiment, the local area is a square region of 77×77 pixels.
3. A nonlinear combination of the following measurements
   a) the response of a target size 7 (t=7) DoG kernel (N×N) centered at (x,y), where in a preferred embodiment, N=77;
   b) the local mean of the original image about (x,y), where in a preferred embodiment, the local area is a square region of 77×77 pixels;
   c) the local standard deviation of the original input image about (x,y), where in a preferred embodiment, the local area is a square region of 77×77 pixels.

The nonlinear combination of point feature 3 is accomplished with a multilayer perceptron (MLP) artificial neural network, consisting of 5 input nodes and 2 output nodes. The first layer nodes use the hyperbolic tangent activation function and the output node uses a linear function.

The MLP is trained using the backpropagation learning rule. The desired response of the first output node is one for microcalcification detections inside a cluster truth box and zero otherwise. The desired response of the second output node is one for microcalcification detections outside a cluster truth box and zero otherwise.

The third point feature is calculated as follows. First, the measurements 3a, 3b, and 3c from above are computed and stored in a vector. Prior to application to the MLP, the input vector is normalized to zero mean and unit variance to provide robustness across a range of input data variations.

The normalized input vector is applied to the MLP and values obtained at each output node. The value of the second output node is subtracted from the value of the first output node to provide the third point feature.

The microcalcification point classifier uses a two class quadratic classifier. The two classes are normal and malignant. The point features for each detection are tested with the classifier providing normal and malignant discriminant values. If the difference of discriminants is negative then the detection is more likely to be normal than malignant. Therefore, that point is rejected from further analysis. However, if the difference of discriminants is positive the detection is retained for further analysis and the associated point features and difference of discriminants are stored for further processing.

Remaining detections are rank ordered, largest to smallest, by their difference of discriminants. If their rank is greater than a predetermined number (50 in a preferred embodiment) they are rejected from further analysis. This operation retains only the microcalcification detections that are most likely malignant. These remaining detections are applied to the subsequent clustering stage.

To be considered a cluster, a set of microcalcification detections must satisfy two requirements. First, every microcalcification in a cluster must be within a specified distance of another microcalcification in that cluster. Second, there must be at least a minimum number of microcalcifications in a cluster. Therefore, when the set of detections from the point classifier are clustered, some detections may be dropped. For example, a lone microcalcification separated from another microcalcification by more than a predetermined maximum distance will not survive the clustering step.

Microcalcification Cluster Features

False positive clusters of microcalcifications are reduced by means of a classifier detailed below. The designator "PT" in a feature's description indicates that the power transform is applied to the measurement. Seven microcalcification cluster features are computed for each of the clusters of microcalcifications, and in the preferred embodiment:

1. Linear density—computed as the number of detected microcalcifications divided by the maximum interpoint distance (PT).
2. Average DoG value—the average value of the target size 7 (t=7) DoG filtered image pixels computed across the pixel locations of the detected cluster.
3. Average DoG size—the average size of each object in the thresholded target size 7 (t=7) DoG filtered image with centroids corresponding to pixel locations of the detected cluster (PT).
4. Average Gabor value—the average value resulting from applying the set of pixels from the digital image corresponding to the pixel locations of the detected cluster through a bank of Gabor filters. Averaging is across the maximum value over all N orientations of filters in the Gabor filter bank. A Gabor kernel is given by the equation:

$$\text{GaborKernel}(x,y) = \exp\{-(T/2)^2[x\cos\theta + y\sin\theta](w/2)\} * \sin(T[x\cos\theta + y\sin\theta]\phi) \quad (5)$$

where
x,y are coordinates of the pixels under the kernel;
T is the period of the sinusoid;
θ is the orientation angle of the sinusoid;
w is the width of the Gaussian function; and
φ is the phase of the sinusoid (0=sine, π/2=cosine).

In this embodiment, Gabor filters are defined at 24 orientation angles, between 0 degrees and 180 degrees, in an M by M array. The period T is found as the kernel size divided by twice the target size. In this embodiment, the kernel size corresponds to a neighborhood of pixels with size 32 by 32 and the target size is 7.0 pixels. The width of the Gaussian function equals 1.0. The phase of the sinusoid equals π/2 to better respond to locally bright spots (PT).

5. Point classifier rank three value—the points in the cluster are rank ordered based on the difference of discriminant scores from the point classifier stage, and the $M^{th}$ largest difference of discriminant score is selected as a feature value for the cluster wherein, in the preferred embodiment, M=3 (PT).
6. Average intensity ratio—this feature is computed by region growing each detection in the cluster using the point locations as seed pixels. The average intensity of image pixels inside each region grown area is divided by the average intensity of image pixels outside the region grown area within a rectangular neighborhood of predetermined size. The intensity ratios for all detections in the cluster are summed then divided by the number of points in the cluster to obtain the average intensity ratio feature (PT).
7. Average second central moment—this feature is computed by region growing each detection in the cluster using the point locations as seed pixels. A rectangular neighborhood of predetermined size centered at the point location in the input image is used normalized by the energy in that neighborhood. Then, a second central moment of the region grown portions of the energy normalized image are computed. The second central moments are averaged to obtain this feature.

The particular second central moment used in this embodiment is defined as $$u_{20} = \sum_x \sum_y (x - \bar{x})^2 f(x, y) \quad (6)$$

where $\bar{x}$ is the x component of the centroid of the region grown detection.

These microcalcification cluster features are applied to the microcalcification cluster classifier, step 5000.

Detection of Densities

Density detection is the process of locating regions of mammographic images associated with malignant masses. Density detection is considered more difficult than microcalcification detection for several reasons. Microcalcifications of concern although small, range in size over a relatively small interval, are typically very bright, and will have high contrast within most breast tissue. Densities of concern however are quite varied in size (0.5 to 2.5 cm), and may have low contrast. Furthermore, microcalcifications have distinct boundaries with breast tissue; whereas the boundaries between densities and background tissue may be ill-defined.

Two primary factors used by radiologists to identify suspicious densities are the distinctness of the lesion's boundary and the lesion's shape. Indistinct margins are indicative of malignancies. Spiculated lesions are more likely malignant than elliptical lesions. Keggelmeyer designed a detector specifically for spiculated lesions as disclosed in U.S. Pat. Nos. 5,633,948 and 5,661,820.

Figure 6:
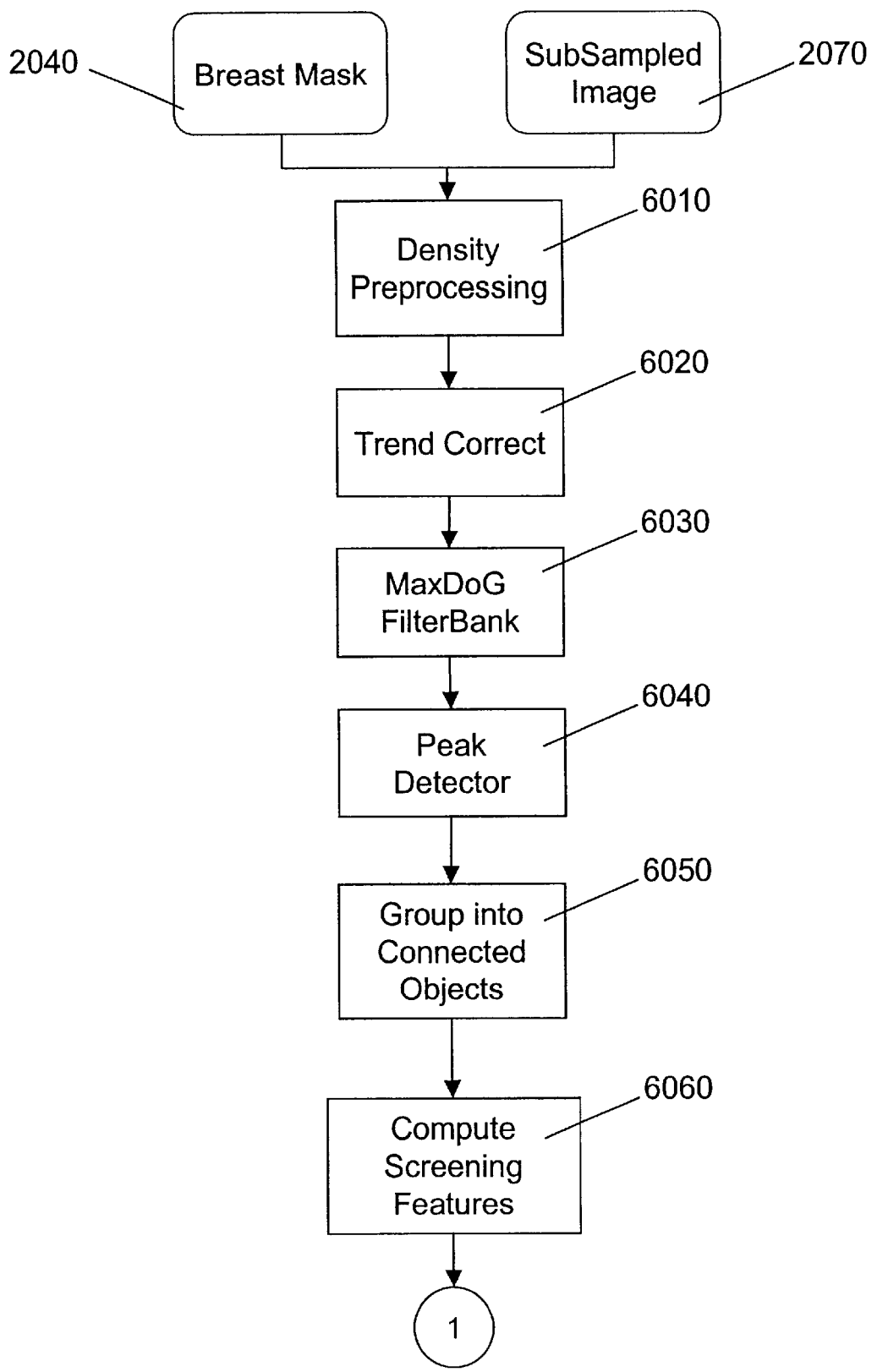
FIGS. 6–7 is a flow diagram of the density detector.
Figure 7:
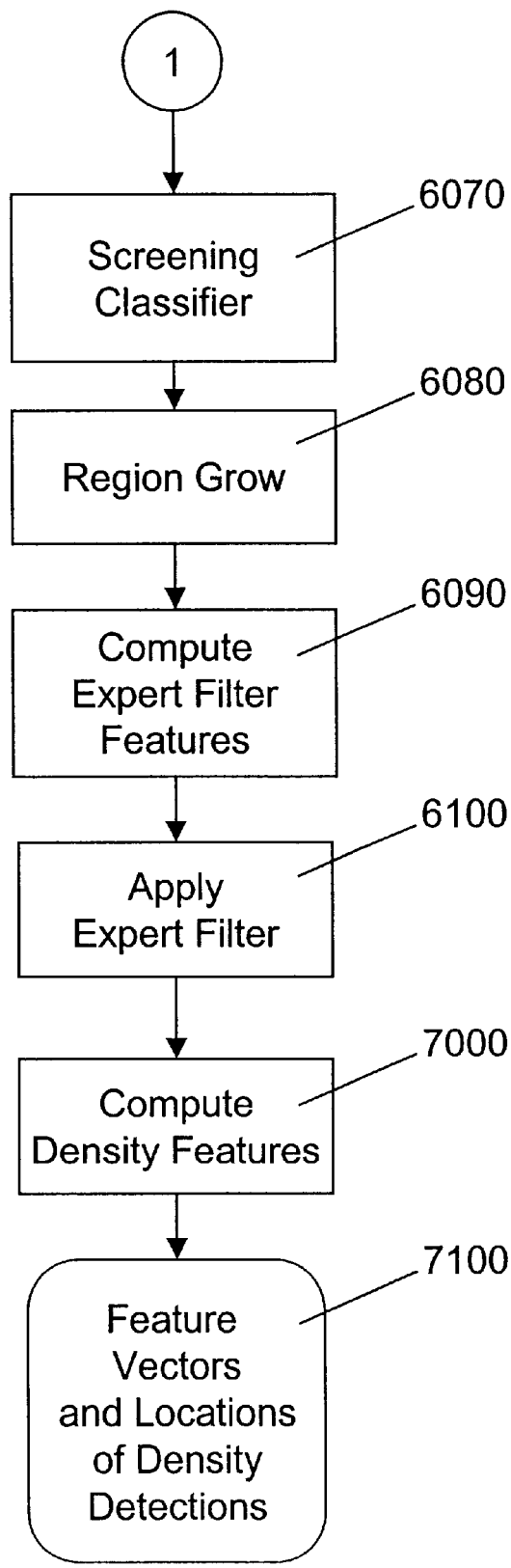

Turning now to FIGS. 6 and 7 where FIG. 7 is a continuation of FIG. 6, there is seen therein a flow diagram illustrating in detail the density detection and density feature computation systems 6000 and 7000 of the invention. The subsampled digital image 2070 and the breast mask 2040 are input to a preprocessing step 6010. In this step, the boundary between the breast and background is smoothed to reduce the number of false detections which occur due solely to the large contrast between breast tissue and the background of the film. In step 6020, the output image from processing the breast tissue is trend corrected whereby the local value of image intensity is estimated in a neighborhood, then subtracted from that neighborhood. This provides increased contrast and therefore allows for detection of lesions with low contrast in the original image. The resultant image is then input to a MaxDoG filterbank in step 6030, the output of which is an image with accentuated locally bright and approximately circular regions with diameters 0.5 to 2.5 cm. Peaks in the MaxDoG image are detected in step 6040. Peaks correspond to the pixel locations locally bright regions in the MaxDoG image. These locations are grouped into connected objects in step 6050 which become the initial detections of the density detector. Screening Features from these connected objects are computed in step 6060 and subsequently input to a Screening Classification step 6070. The Screening Classifier's primary purpose is to reduce the number of initial detections prior to more detailed subsequent analysis while retaining malignant regions for further consideration. Detections passing the screening classifier are input to a region growing step 6080. Region growing provides more accurate estimate of the shape of the lesion. Region growing is a crucial step of the invention. Many methods have been described for region growing in mammography implying that it is a difficult problem. The region growing method described in this invention is very general and advances the state of the art in two primary areas: adaptive weighting at each iteration of the growing, and classifier based selection of the best region grown mask, designed using a database of hand truthed lesions. The region grown objects are analyzed in the Density Expert Filter Feature Computation step 6090. Here, features are computed for the purpose of separating suspicious and not suspicious regions. These density features are analyzed in an Expert Filter step 6100 to remove those objects most obviously not associated with cancer. The detections remaining after the expert filter step are input to the Density Feature Computation step, 7000. The output of the density detector includes density feature vectors and locations of detected densities, 7100.

A more detailed discussion of the steps in the density detection process follows. The subsampled digital image 2070 and the breast mask 2040 are input to a preprocessing step 6010. Here, the image is first prepared for subsequent processing to reduce the number of false detections due discontinuities associated with the breast and mammographic film border edges. Large discontinuities cause ringing when filters operate on an image. Ringing can cause false detections and may obscure lesions, causing them to not be detected. The density preprocessing step 6010 reduces these undesirable effects.

Density preprocessing is used to reduce ringing on the edge of the breast due to the sharp discontinuity in intensity between the background and the tissue. Preprocessing begins with the formation of two masks, the dilated breast mask and the eroded breast mask. Trend correction is then applied to the region between the eroded and dilated breast masks. This operation maintains the detail in the image and eliminates the local background brightness. The local mean is calculated at the edge of the dilated mask and this value is added to the local trend corrected region. This produces an image that maintains detailed information in the transition between breast and background while reducing the discontinuity in brightness between breast and background.

After the density preprocessing, a trend correction step 6020 is applied to the image. The trend correction step uses a standard Bezier surface fitting algorithm. Since the Bezier surface is a bi-cubic, parametric patch, 16 control points are used to characterize a surface. These 16 control points are organized in a 4×4 grid, and the corresponding parametric surface is used as an approximation to the background image intensities in the local portion of the image. Each pixel intensity within the boundary of the 4×4 grid has subtracted from it an approximation to the background intensity value resulting in a density preprocessed image for input to the next step.

Figure 8:
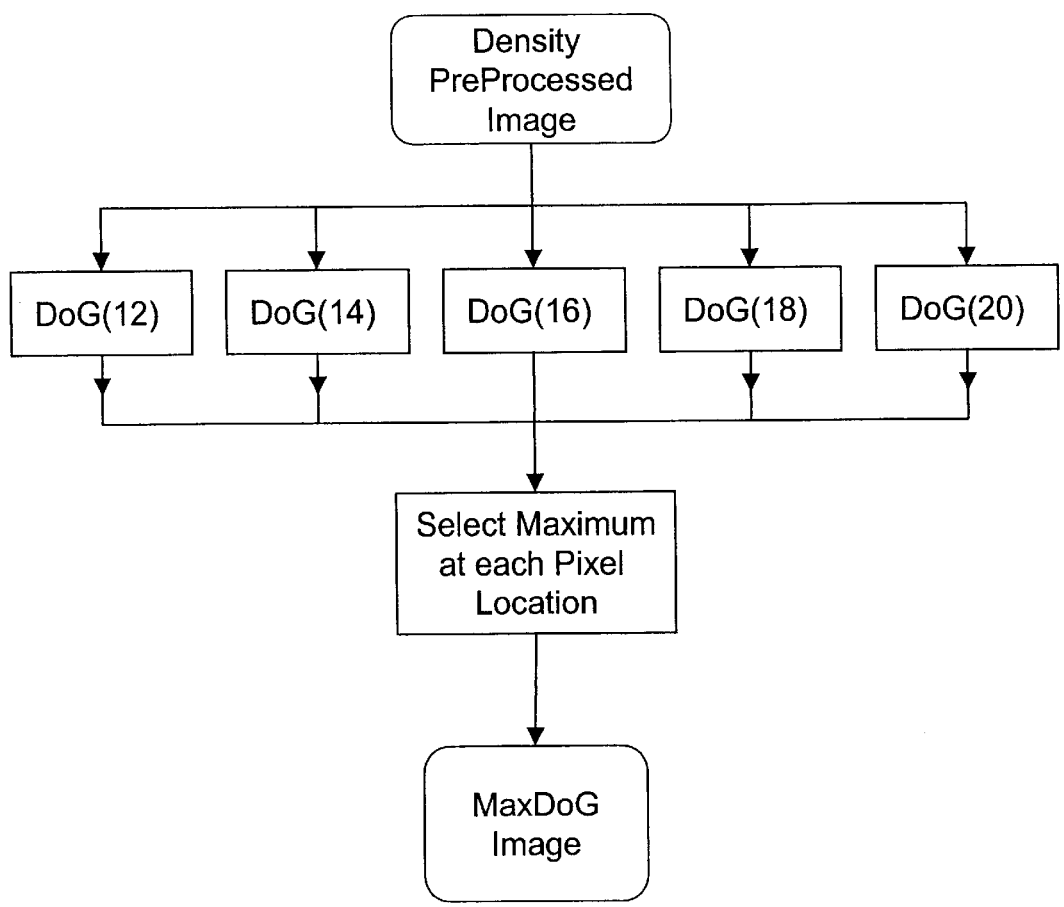
FIG. 8 is a flow diagram of the Difference of Gaussians filterbank.

The density preprocessed image is applied to the MaxDoG filterbank, 6030. The MaxDoG filter bank, shown in FIG. 8, first convolves the input image with a bank of DoG filters. The target sizes of the five DoGs are t=12, 14, 16, 18, and 20. These target sizes relate to diameters of lesions in the subsampled image. The relationship between the target size t and the standard deviations of the DoG kernels is $\sigma_1=(t/3.2)$ and $\rho_2=(t/2.0)$. Each DoG kernel is individually convolved with the input image, producing five DoG filtered images, each image most sensitive to a particular target size. Then, the maximum response at each pixel location is selected across all of the DoG filtered images to create the MaxDoG output image.

Since a DoG kernel is a rough approximation to how a cancer density appears on a mammogram, the response of convolving such a kernel with an image indicates regions of the image that resemble the kernel, and therefore resemble a cancer density. DoG kernels respond strongest when the density is approximately the same size as the DoG; hence, a bank of five differently sized DoGs is used. In this way, densities of different sizes spanning a diagnostically relevant size interval are detected.

The MaxDoG image is input to a peak detector step, 6040. Here, peaks in the MaxDoG image that may be cancer densities are located for further processing. The steps are as follows. First, for each MaxDoG image pixel location, the peak detector examines all pixels which are three pixels away from that location. If the current pixel's intensity value is greater than 90% of the pixels a distance of three pixels away, the current pixel is set to the logical value of '1' on a local maxima image at the output of the peak picking stage. Otherwise the output image from peak picking is set to the logical value of '0'.

The next step, 6050, groups connected pixels with values of '1' in the local maxima image into logical "objects". This is accomplished with a neighborhood algorithm as follows. The local maxima image is searched in raster order (from the top left of the image to the bottom right of the image, row by row) for pixels indicated to be local maxima. For each local maxima pixel found, the neighboring pixels above it and to the left of it are examined. If neither neighbor pixel is part of an object, then a new object is created with the local maxima pixel as its first member. If one of the neighbors is already part of an object, the local maxima pixel is placed in that object. If both neighbors are part of an object, then their objects are combined and the local maxima pixel is placed in the resulting object. This continues until the whole image has been examined. At this point, the algorithm has generated an ordered list of N objects on the local maxima image. Objects are identified by the set of pixel locations associated with each object index 1 to N.

The next stage of the density detector eliminates many of the regions initially detected by the density detector which are not likely to be cancerous regions. Quantitatively, the number of detections is reduced from often over 100 to some predetermined limit, here set to 20. Several steps contribute to this reduction. The first is to remove all detections located in the pectoral muscle, using the pectoral mask, 2060. Next, only a predetermined number of detections with the highest responses in the MaxDoG image are kept. This is accomplished by performing a descending sort on the maximum value from the MaxDoG image under each detected object, then removing from further consideration those objects ranking greater than the predetermined number, 35 in this embodiment. The motivation for this step is that the larger the MaxDoG value, the better the lesion matches the model for the target. The final step in this stage involves calculating density screening features and classifying the detections, keeping no more than a second predetermined number of detections that pass the quadratic screening classifier.

Inputs to the screening classifier are the surviving detected objects and associated set of density screening features. The designator "PT" in a feature's description indicates that the power transform is applied to the measurement. The density screening features in the preferred embodiment are:

1. Maximum of MaxDoG—maximum value of the MaxDoG image from the set of pixels corresponding to the detected object (PT).
2. Standard deviation of MaxDoG—standard deviation of the MaxDoG image from the set of pixels corresponding to the detected object.
3. Normalized mean of MaxDoG—mean of MaxDoG image under the detected object divided by the mean of the subsampled image from the set of pixels corresponding to the detected object.
4. Minimum of MaxDoG—minimum MaxDoG value of the MaxDoG image in a 5×5 pixel block centered on the detection.
5. Normalized mean of MaxDoG 5 by 5—mean of the MaxDoG image in the centered 5×5 pixel block divided by the mean of the subsampled input image about the same block.

These density screening feature vectors are input to the density screening classifier. The density screening classifier uses two discriminant functions, one each for normal and abnormal. After the discriminants are computed, the difference is found. This difference is compared to a predetermined threshold value. If the difference in discriminants is less than the threshold, the detected object is removed from further consideration. Those regions that have a difference of density screening discriminants greater than the threshold are ranked by the difference of discriminants, such that the largest difference of discriminant has the smallest rank value, i.e. 1. Any detected object that has a rank greater than yet another predetermined upper limit is eliminated from further consideration. The remaining detected objects are passed to the next stage for subsequent processing.

Each remaining detected object is now input to a region growing step, 6080. Here, the shapes of each detection are more closely estimated. The improved shape estimation is used in the computation of further density features, 7000, for the next stage of classification, step 8000. Shape estimation by region growing is now described.

Region Growing

At this stage of the density detector, region growing is used to estimate the boundary of the detections. Ideally, all detections correspond to suspicious lesions. However, in practice, the steps up to this point detect regions not associated with cancer. A useful method to reject unwanted detections is to compute features based on the shape of a locally bright-region. However, due to the complexity of breast tissue, the often subtle nature of suspicious regions, and the indistinct edges of suspicious regions, shape estimation is a difficult problem.

Region growing is still an active area of research in the medical image processing community. Shape estimation is difficult to automatically accomplish in medical imagery due to the subtlety of lesions, the complexity of their boundaries, and the properties of the background image surrounding the lesion. In many cases the surrounding tissue contains bright structures not related to the lesion. One drawback of a conventional percentage-based floodfill is that it can prematurely terminate if a bright, elongated structure is present in the image chip. This occurs if the floodfill grows into the structure, because the tendency of the floodfill is to follow the bright, elongated structure all the way to the bounds of the image chip.

The region growing method described in this invention has two unique aspects. First, iterative dynamic weighting of the image is used to reduce the effects of background structure on the estimated shape. Iterative dynamic weighting is the process of computing a mixture image as the sum of an input image and its weighted version. The weighting is a function of the current shape estimate. Second, a classifier is used to select the shape most representative of the lesion. The problem of selecting the best shape estimate from a set of estimates created during the iterative process is solved by the use of a "region grow mask selection classifier". This classifier identifies the best shape estimate for the region based on region grow discriminant functions. The set of candidate masks is formed using a floodfill algorithm with iterative dynamic Gaussian weighting to insure that the grown regions are compact and reasonably well formed. The output is a set of selected region grown masks and region grow discriminant values associated with each detection.

Figure 9:
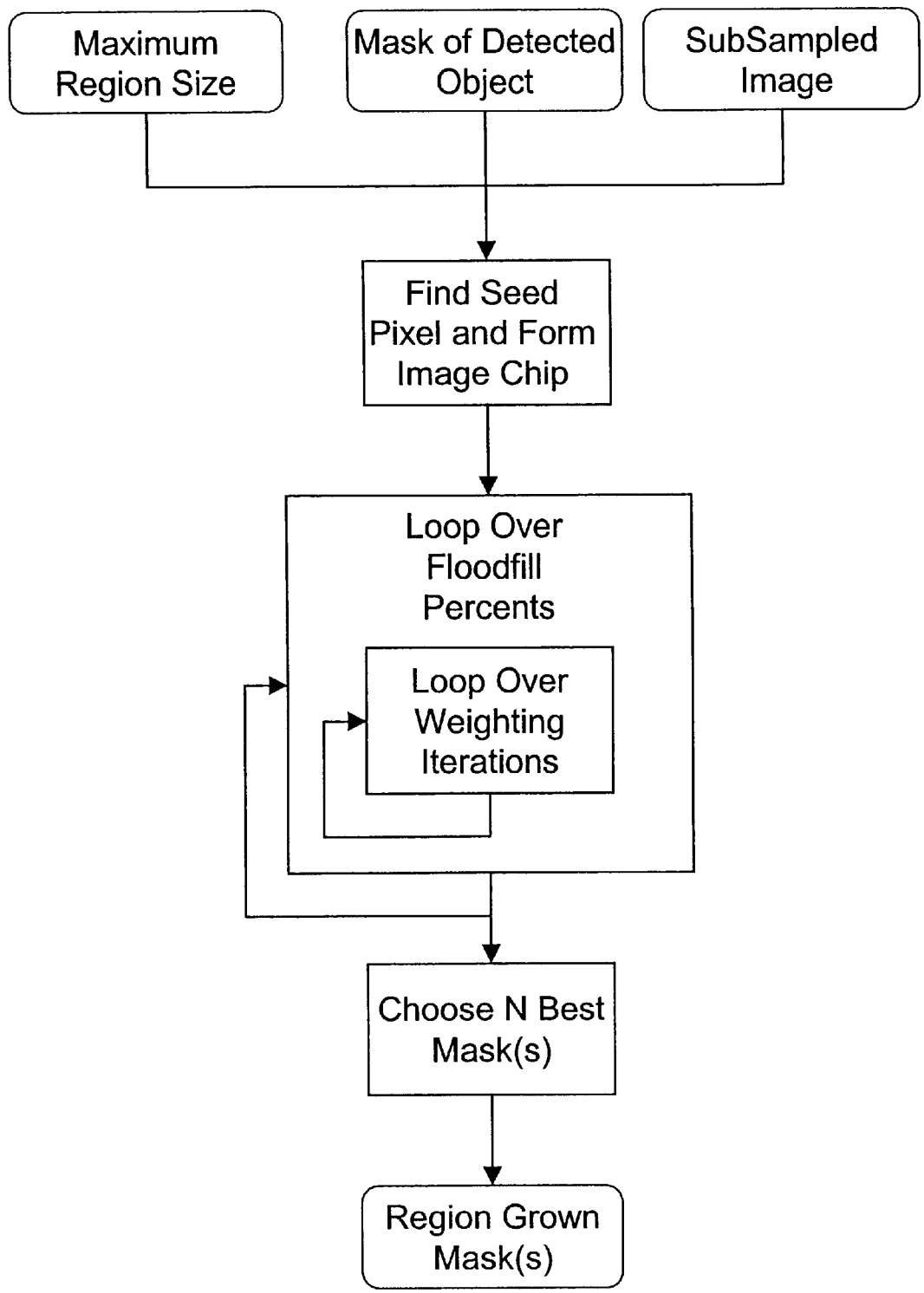
FIG. 9 is a flow diagram of the region growing method.

In the application of this invention, region growing is applied to detected objects. The detected objects passing the density screening classifier are input to the region growing step, 6080. A block diagram showing an overview of the operations is provided in FIG. 9. Inputs to the region growing step are the subsampled image, a mask of the detected object, and a predetermined maximum allowed region grow neighborhood size. The output is a set of the 'best' Boolean images associated with the lesion. '1' pixels in the Boolean images represent the shape estimates for the lesion. These Boolean images are known as region grown masks. The number of masks to ultimately select is predetermined as N, where the selection of the best N masks is based on the discriminant values associated with each mask.

The method for region growing described in this invention uses two iteration loops. An outer iteration is used to establish a monotonically decreasing threshold. Within the outer loop, multiple mask estimates are created through the iterative dynamic weighting loop. The discriminant values associated with the region grown masks are also provided as an output for subsequent processing.

The region growing method is now described in detail. A pixel location, referred to as a seed pixel, is found as the brightest point in the subsampled image in the area of the detection This is the beginning of the process; the first current region grown mask is set to '1' at the location of the seed pixel. An image chip is then formed by selecting a square neighborhood of twice the maximum region grow neighborhood size centered about the seed pixel.

Next, a percentage-based floodfill is successively applied to the image chip to create Boolean masks of the region. Floodfill is the operation of creating a next version of a mask by testing all pixels connected to the current mask, then adding to the current mask the pixels passing the test. To be added to a mask, a pixel under consideration must 1) have an intensity within x% percent of the seed pixel's intensity and 2) be connected to another pixel already located in the region. The floodfill percentage, x, is sequentially increased from predetermined lower to upper limits in predetermined step sizes. In the preferred embodiment, the floodfill percent ranges from 1% to 40% in steps of 1%. One criteria criterion for terminating the floodfill is if the floodfill percentage reaches the upper limit. A second criteria criterion for terminating the floodfill is if the flood filled region for a given percent exceeds the maximum region size. Exceeding the maximum size here is defined as any portion of the mask contacting the edge of the square neighborhood. In practice, the second terminating criteria is vastly more common.

Figure 10:
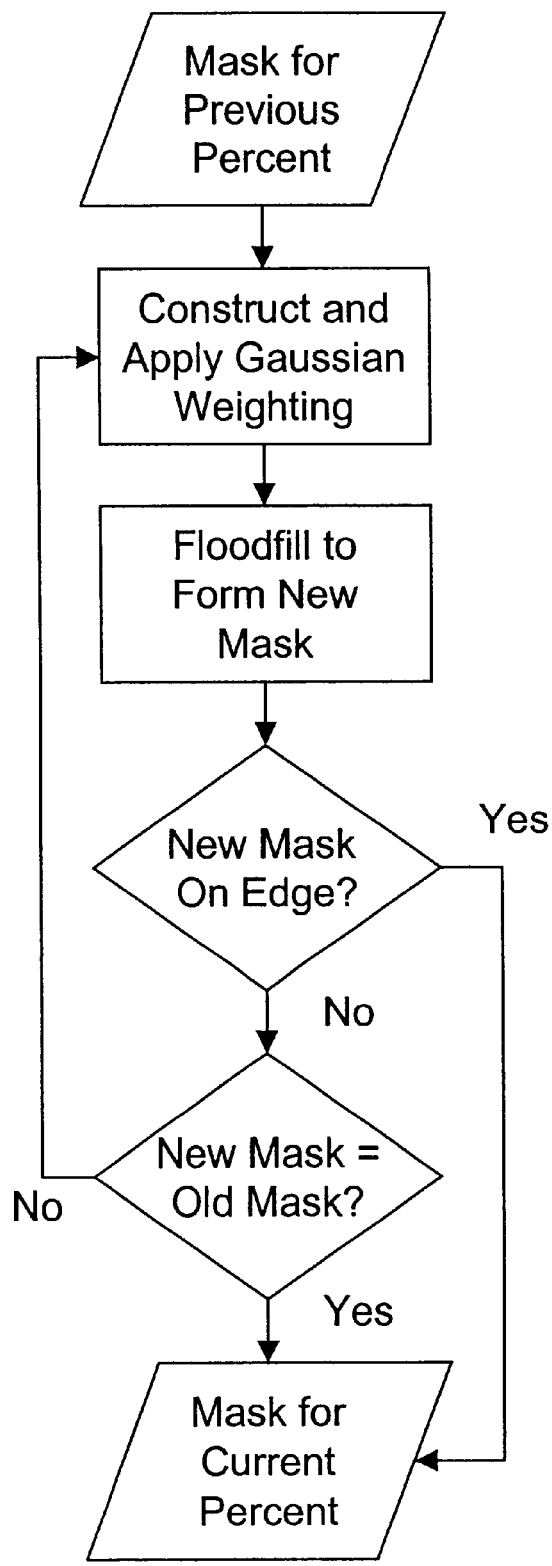
FIG. 10 is a flow diagram detailing the adaptive weighting portion of the region growing method.

Increasing the floodfill percentage allows the region to grow. Controlling the growth is accomplished with the following additional iterative set of steps for each percentage. These additional steps involve creating and applying a circularly symmetric Gaussian weighting kernel dynamically to the image chip pixel values. The Gaussian weighting kernel is found as $$\text{GaussianWeightingKernel} = \exp\{(-\tfrac{1}{2}\sigma_r^2) \cdot [(x-\mu_x)^2 + (y-\mu_y)^2)]\} \quad (7)$$

where $\mu_x$ and $\mu_y$ are the x and y coordinates of the centroid of the current mask and $\sigma_r$ is three times the maximum distance from the mask's centroid to the edge of the current mask. This window is multiplied with the input image chip to form a weighted image. Then, a mixture image is created for the subsequent floodfill operation as $$\text{MixtureImage} = \alpha^*(\text{input image chip}) + (1-\alpha)^*(\text{weighted image}) \quad (8)$$

wherein in the preferred embodiment, $\alpha = 0.5$. FIG. 10 details the dynamic Gaussian weighting and iterations within a specific floodfill percent value.

For each iteration, a mixture image is formed. First, the Gaussian weighting kernel is created from the current mask. The weighting is then applied to the original image to form a weighted image, and a mixture image is created from the weighted image and the original image. Region growing is performed in the mixture image.

These steps create a set of masks, one for each percent floodfill value. Features are computed from the masks, then input to the region grow mask selection classifier, designed to select a predetermined number of 'best' density masks. The selected masks can be masks produced from any subset of the percent floodfill values. These best masks, along with their region grown mask selection classifier discriminant values are stored for subsequent processing.

This subset of masks passing the classifier are applied to a pod chopper to remove extraneous tendrils from the core growth. First, a single erode is performed on the region grown mask to break the connections between the pods and the core. Second, objects are formed from the eroded mask and only the largest object is retained. Finally, a mask of the largest object is dilated once within the bounds of the original mask to form the pod chopped version of the region grown mask.

Region Grow Mask Features

A classifier is used to select the best set of region grown masks, therefore, features are required. The features computed from the region grown mask are as follows wherein the Bauer-Fisher ratios referenced below are described in detail in the section for density features. The designator "PT" in a feature's description indicates that the power transform is applied to the measurement.

1. Bauer-Fisher Ratio E5L5, First Iteration vs. Previous Percent—the Bauer-Fisher ratio of Laws Texture measures using the Laws kernel function E5L5. The two areas used to create this feature are the mask of the first weighting iteration of the previous floodfill percent and the non-overlapping portion of the region of the first weighting iteration of the current floodfill percent. Non-overlapping portion indicates the portion of one region that is not included in the other region. This results in a core region for the mask from the previous percent and an annulus for the non-overlapping portion from the mask of the current percent. The Laws texture is calculated within the core and annulus, then the Bauer-Fisher is ratio calculated.

2. Area difference, Last Iteration vs. Previous Percent—the difference in area between the mask of the final weighting iteration of the current floodfill percent and that of the mask of the final weighting iteration of the previous floodfill percent (PT).

3. Bauer-Fisher Ratio L5E5, Last Iteration vs. Previous Percent—the Bauer-Fisher ratio of Laws Texture measures using the Laws kernel function L5E5. The two areas used to create the feature are the region of the last weighting iteration of the previous floodfill percent and the non-overlapping portion of the region of the last weighting iteration of the current floodfill percent (PT).

4. Bauer-Fisher Ratio R5S5, First Iteration vs. Previous Percent Last Iteration—the Bauer-Fisher ratio of Laws Texture measures using the Laws kernel function R5S5. The two areas used to create the feature are the region of the last weighting iteration of the previous floodfill percent and the non-overlapping portion of the region of the first weighting iteration of the current floodfill percent.

5. Bauer-Fisher Ratio E5L5, First Iteration vs. Previous Percent Last Iteration—the Bauer-Fisher ratio of Laws Texture measures using the Laws kernel function E5L5. The two areas used to create the feature are the region of the last weighting iteration of the previous floodfill percent and the non-overlapping portion of the region of the first weighting iteration of the current floodfill percent.

These features are created for every mask at the end of each floodfill percent iteration cycle. The features are tested with the region grown mask classifier to select the 'best' subset of masks.

Region Grown Mask Classifier

The region grown mask classifier determines the set of 'best' shape estimates from the prior region growing step. The region grown mask classifier uses a quadratic classifier to determine the best region grow masks for a detected object. Many region grown masks are generated up to this point and features from those grown regions are input to the classifier. For each mask, the classifier computes discriminants associated with 'best' and 'not best' categories. The discriminants are subtracted, providing region grown mask quality scores. The differences are then rank ordered with the largest difference receiving the rank value of 1. The top N masks are selected based on the ranking.

Density Features

Density features are calculated for each detection from the region grow stage. These features are passed to the density classifier, where only the detections most likely to be cancer densities are kept. Many of the features are contrasts of one type or another, such as intensity contrasts or texture contrasts. The two measures of contrast used in the density detector features are the Bauer-Fisher ratio $$\text{Bauer-Fisher ratio} = \text{sign}(\mu_1 - \mu_2) * (\mu_1 - \mu_2)^2 / (\sigma_1^2 + \sigma_2^2) \quad (9)$$

and the mean ratio $$\text{mean ratio} = (\mu_1 - \mu_2) / (\mu_1 + \mu_2) \quad (10)$$

The subscripts 1 and 2 represent two regions on an input image corresponding, respectively, to an area within a detection and a second area outside the detection. Measurements are computed in each region. In some cases measurements may simply be pixel values from the input image. The area within a detection is defined as all of the points that are part of the region grown mask. The area outside the detection is defined as an inverse mask of the region grown mask, bounded by a box twice as large as the region grown mask (with a minimum of a 1 cm increase in each direction). Some features additionally erode the inside and outside masks so as to not so heavily depend on an exact distinction between inside and outside. In the case of eroded mask areas the inside mask is eroded once; the outside mask is eroded until it is half of its original area. Neither mask is eroded to become smaller than 30 pixels.

The limitation of the Fisher ratio is that the relationship between the mean values is lost; there is no information regarding whether $\mu_1$ is greater or less than $\mu_2$. The Bauer-Fisher ratio incorporates the sign(.) term to add the relative information to the Fisher ratio.

Several of the features also use by-image normalization. By-image normalization is a way of eliminating the need for global thresholds, which can be problematic in certain contexts. Three different by-image normalization schemes are used: rank ordering with the largest value first, rank ordering with the smallest value first, and subtracting each feature's mean value for that image from the feature vector. These methods are respectively referred to as: rank ordered down (ROD), rank ordered up (ROU), and zero mean by image (ZMI). ROD and ROU feature values are the integer value of the rank while ZMI feature values are real numbers.

A final class of features created in the density feature step is "delta features". Delta features are created by taking the maximum, minimum, mean or standard deviation of a feature value across all N masks passing the region grow classifier. Typically, false positives have fewer "good" masks returned from the region grow than cancer densities, and delta features exploit this difference.

Prior to computation of the density features, an expert filter step, is applied. The expert filter performs bounds checks on expert filter features from all surviving detections. If expert filter features do not fall within the bounds, a region is removed from further consideration. Noting that "best" refers to the region grown mask ranked number 1 from the region grown mask selection classifier, the expert filter features are as follows:

1) circularity of the best region grown mask.
2) length of the major axis ($\lambda_1$) of the best region grown mask.
3) standard deviation of the Laws E5L5 texture image under the best region grown mask.
4) Bauer-Fisher ratio of the Laws E5L5 texture image inside and outside the best region grown mask.

These features are formed from measurements on image sections. For example, expert filter feature 3 is found by first using the E5L5 texture image as the measurement. The feature is found as the standard deviation of the measurement.

Features are computed for bjects passing the expert filter. The designator "PT" in a feature's description indicates that the power transform is applied to the measurement. The following eighteen density features computed for subsequent input to the density classifier:

1) mean of the MaxDoG image under the original detected object (PT).
2) mean ratio of image intensities inside and outside the best region grown mask (PT).
3) perimeter length of the best region grown mask, ZMI (PT).
4) mean of the MaxDoG in the screener under the original detected object, ROD (PT).
5) area of the best region grown mask, ROD (PT).
6) mean ratio of image intensities inside and outside the best region grown mask, ROD (PT).
7) aspect ratio of the best region grown mask, ROU (PT).
8) total pod area removed from the best region grown mask.
9) mean across the top four region grown masks of the region grown mask circularity (PT).
10) mean across the top four region grown masks of the mean of the Laws R5S5 image inside the region grown mask (PT).
11) mean across the top four region grown masks of the mean ratio of the Laws R5S5 image inside and outside the best region grown mask.
12) mean across the top four region grown masks of the Bauer-Fisher ratio of intensity inside and outside the eroded region grown mask (PT).
13) standard deviation across the top four region grown masks of the mean ratio of the Laws L5E5 image inside and outside the eroded region grown mask (PT).
14) minimum across the top four region grown masks of the length of the minor axis ($\lambda_2$) of the region grown mask (PT).
15) minimum perimeter to length ratio across the top four region grown masks (PT).
16) minimum across the top four region grown masks of the $\mu 20$ (second moment) (PT).
17) minimum across the top four region grown masks of the Bauer-Fisher ratio of the Laws E5L5 image inside and outside the eroded region grown mask
18) maximum across the top four region grown masks' perimeter.

It is important to distinguish the present invention from the prior art at this point by noting that the best four masks do not necessarily come from consecutive floodfill percentage values. These density feature vectors associated with objects passing the expert filter are applied to the density classifier, 8000.

Classifying Microcalcification Detections

Figure 11:
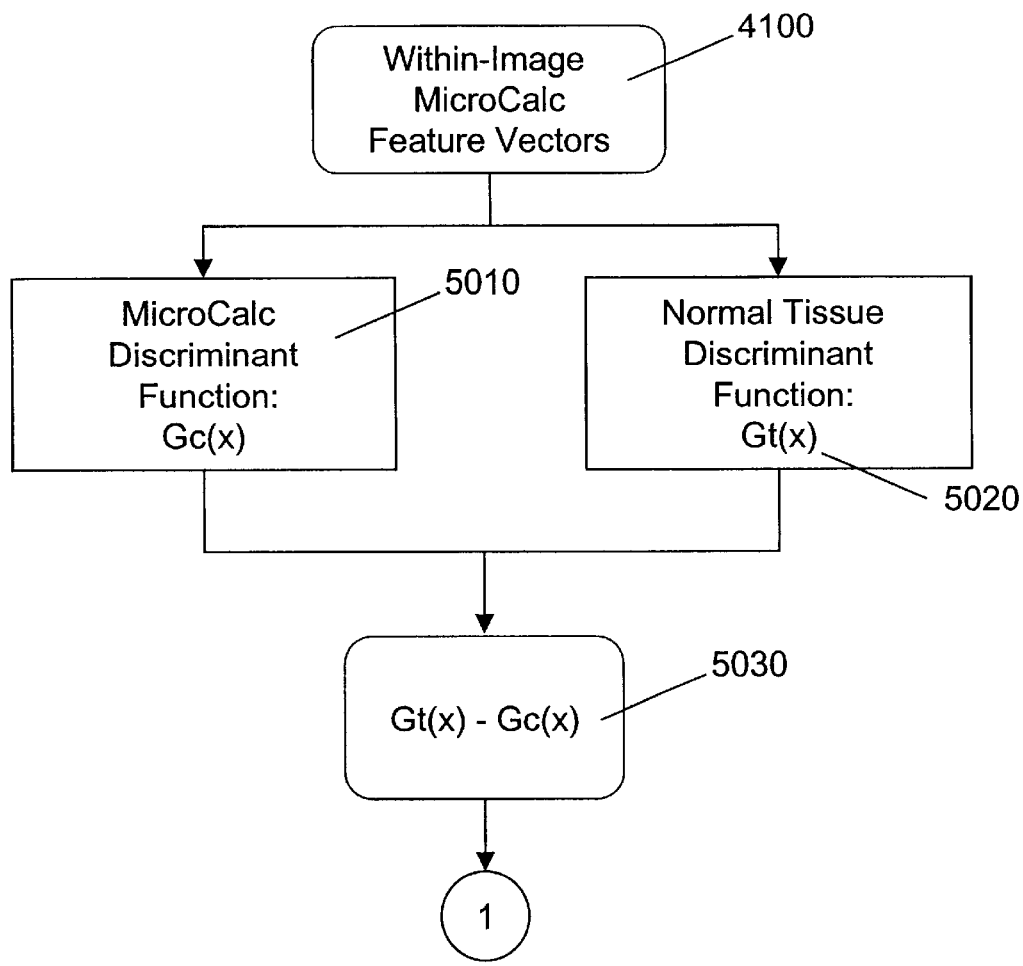
FIGS. 11–12 is a flow diagram illustrating the clustered microcalcifications classifier.
Figure 12:
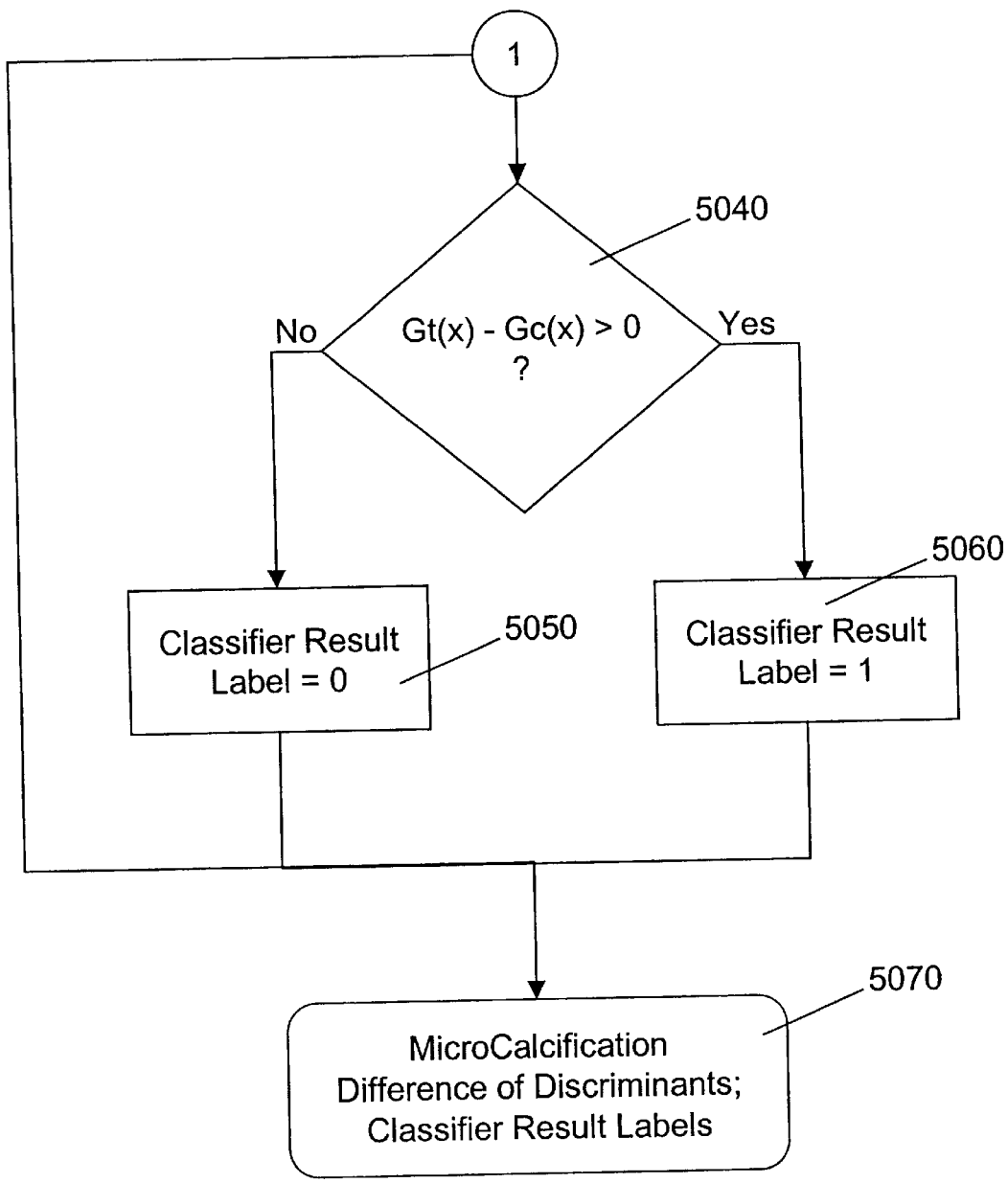

The within-image microcalcification cluster feature vectors, 4100, are provided as inputs to the microcalcification classifier as shown in FIGS. 11 and 12 where FIG. 12 is a continuation of FIG. 11. These microcalcification cluster feature vectors are applied to two quadratic discriminant functions, $G_c(x)$ and $G_t(x)$, steps 5010 and 5020. $G_c(x)$ is the discriminant function for truthed clusters of microcalcification and $G_t(x)$ is the discriminant function associated with tissue regions outside truth boxes. Tissue outside a truth box is considered normal. The difference of discriminants, $G_t(x)-G_c(x)$ is computed in step 5030, to produce a "delta discriminant". In step 5040, the delta discriminant is compared to a threshold value, in this embodiment the threshold is 0. If the delta discriminant is less than the threshold, the detection is considered normal and receives the class label of '0' in step 5050. Otherwise, the detection is considered suspicious and receives the class label of '1' in step 5060. The delta discriminant and the classifier labels are stored in step 5070 for subsequent analysis in the post processing phase 9000.

Classifying Density Detections

Figure 13:
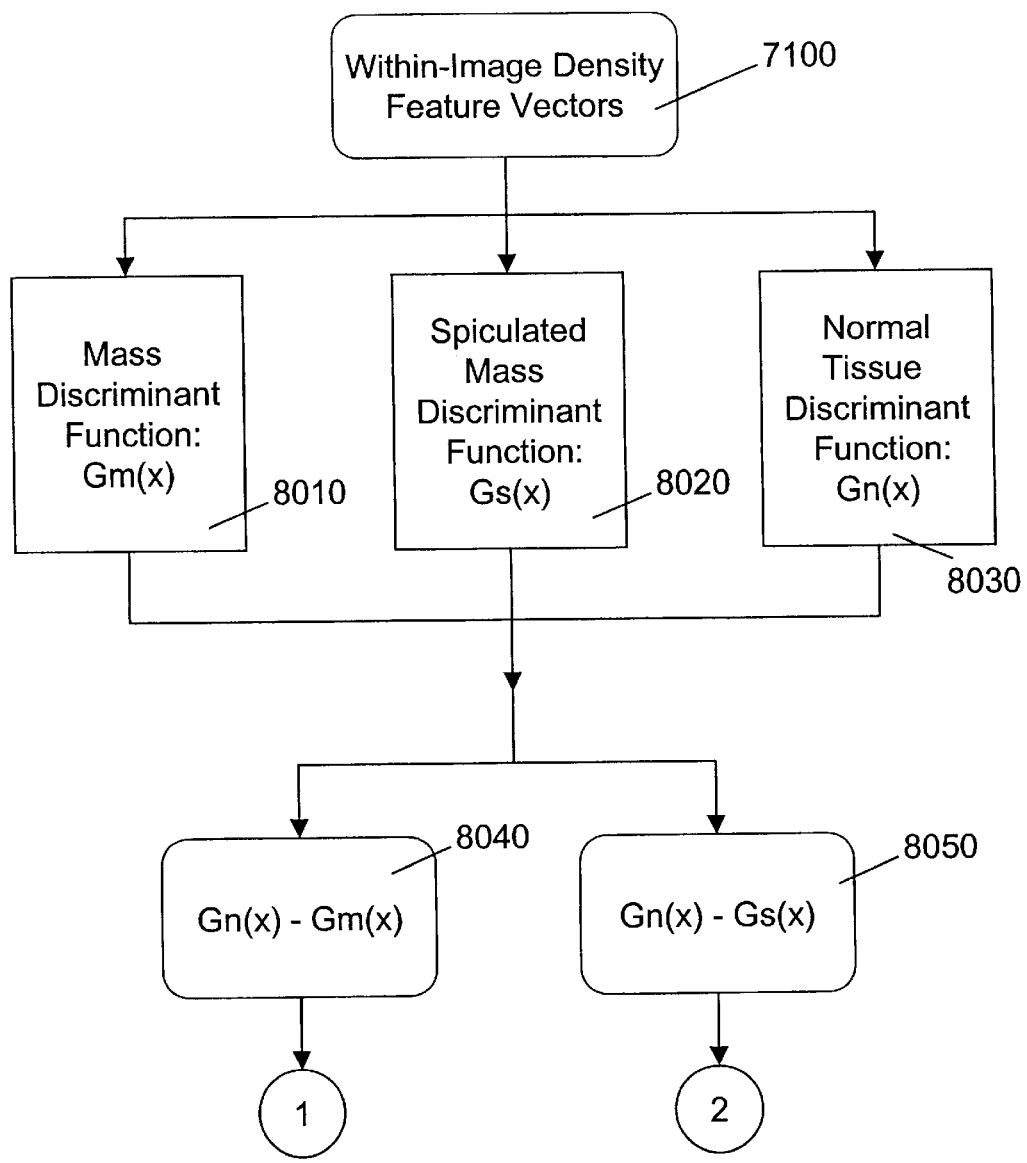
FIGS. 13–14 is a flow diagram illustrating the density classifier.
Figure 14:
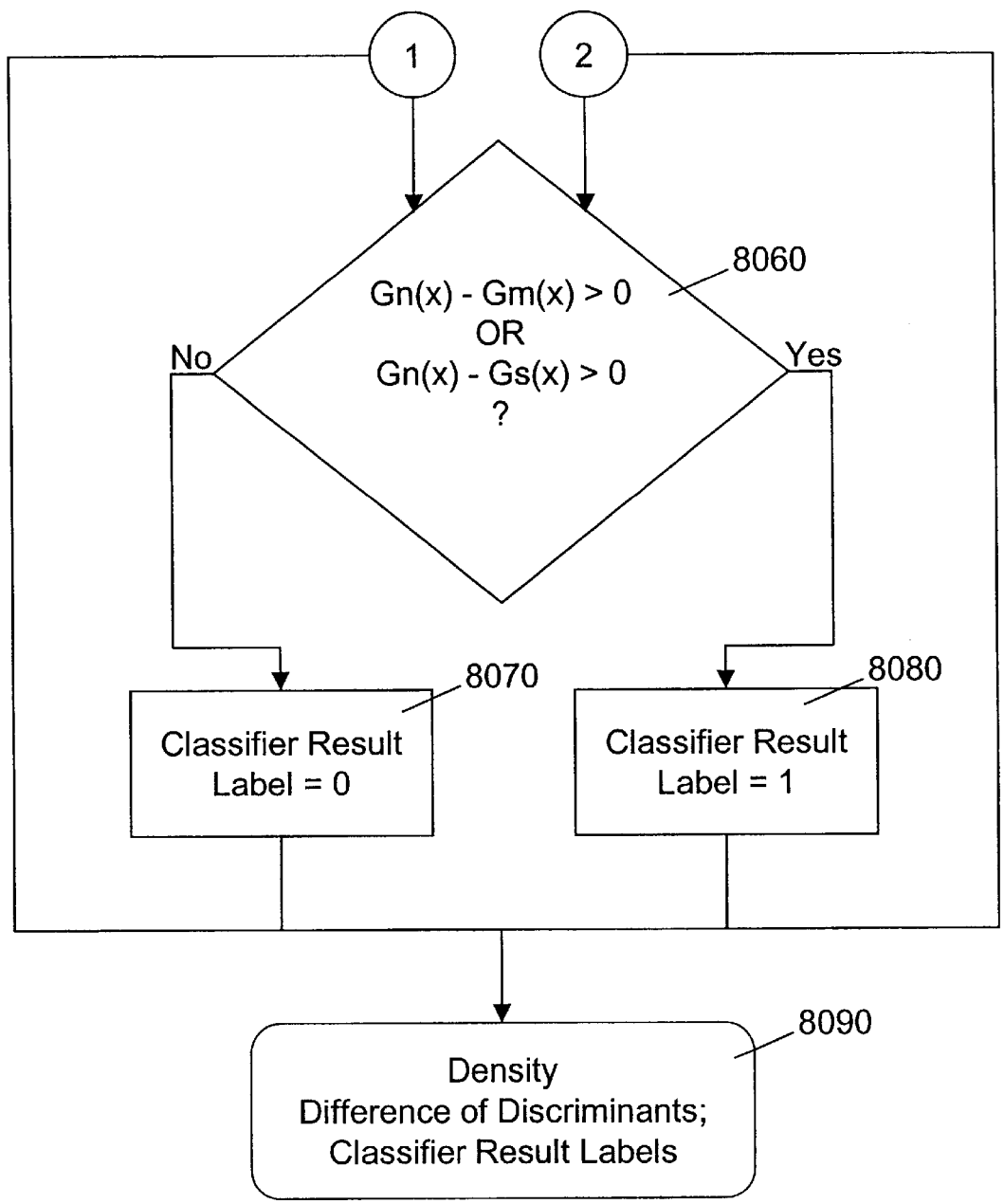

The within-image density feature vectors from the density detector are input to the density classifier as shown in FIGS. 13 and 14 where FIG. 14 is a continuation of FIG. 13. These density feature vectors are applied to three quadratic discriminant functions, $G_m(x)$, $G_s(x)$, and $G_n(x)$. $G_m(x)$, 8010, is the discriminant function for elliptical masses. $G_n(x)$, 8030, is the discriminant function for tissue outside the truth box. Tissue outside the truth box is considered normal. $G_s(x)$, 8020, is the discriminant function for spiculated masses. Two delta discriminants are then formed. In steps 8040 and 8050, the mass and spiculated mass discriminants are subtracted from the normal discriminant. In step 8060 the two delta discriminants are compared to a threshold. In this embodiment, the threshold is 0. If both of the delta discriminants are less than the threshold, the detection is considered normal and receives the class label of '0' in step 8070. However, if either of the detections is greater than the threshold, the detection is considered suspicious and therefore receives the class label of '1' in step 8080. The two density delta discriminants and the class labels are stored in step 8090 for subsequent analysis in the post processing phase 9000.

Post Processing

The post processing portion, 9000, of the invention performs three primary functions. The steps are Case Based Ranking, steps 9020 and 9030; Image Context step 9040; and Normalcy Classification, steps 9050 and 9060.

Figure 15:
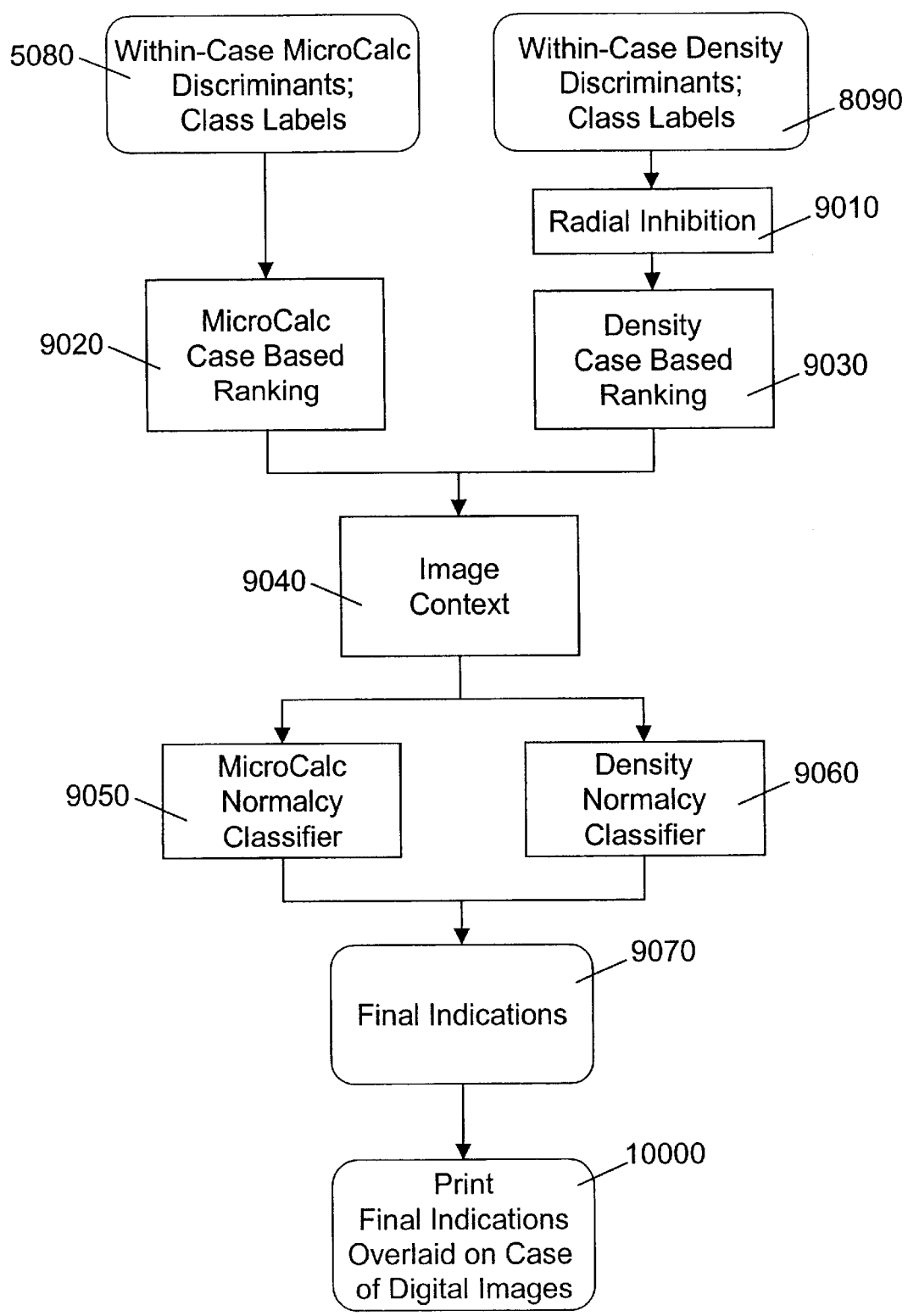
FIG. 15 is a flow diagram of the post processing stage.

FIG. 15 shows the post processing phase of the invention. The operations are described now in overview. Inputs to post processing are the within-case microcalcification delta discriminants and the within-case density delta discriminants with class labels of '1'. Within case refers to the set of images input from the same patient from one mammographic screening exam. At each post processing step, the class label of a detection may change from a '1' to a '0'. Only those detections with class labels of '1' at the output of the post processing phase are displayed to the end user.

The first step in post processing, is Radial Inhibition, 9010. If more than one density detection has a label of 1 from the density classifier within some local region, only the most cancer like region is retained for consideration. The regions that are affected by this module are those that occur within a one centimeter radius, measured from center to center, of each other. The criteria by which one region is considered more cancerous than another is the sum of difference of discriminants from the feature classifier. The region with the largesr sum of difference of discriminants is considered to be more cancer like and is therefore retained as a potential cancerous region. The region with the smaller sum of discriminants is removed from further consideration.

Case Based Ranking

In Case Based Ranking (CBR), 910, only the top N detections from the case are retained with no more than M detections retained on any one image. Retain denotes leaving the class label as '1'. Eliminate denotes changing the class label to '0'. The number of detections that retain their classification label depends on how many images are in the case, the distribution across the images, and the category of detections (microcalcification or density).

CBR inputs are delta discriminants for density and microcalcification classifiers and class labels for each detection in the case. CBR operates independently on both the microcalcification and density detections. Within lesion category (microcalcification or density), the detections are rank ordered by a quality score, largest to smallest. In the preferred embodiment, quality scores are delta discriminants in the case of microcalcifications, or by the sum of their delta discriminants in the case of densities. Recall the microcalcification classifier provides a single delta discriminant, normal minus malignant, while the density classifier provides two delta discriminants: normal minus spiculated, and normal minus mass. In both cases, the larger the quality score, the more likely a detection is to be cancerous.

The number of detections to allow per case is determined based on a predetermined number of allowed detections, N, assuming a four film case. When other than four films constitute the case, the number of allowed detections is found as $$D = \text{ceil}(I * N/4) \tag{11}$$

where I is the number of films constituting the case and ceil(.) denotes rounding up to the next integer. For example, let the number of allowed detections for a four film case be seven. The number of detections to allow for a case with three films is ceil(3*7/4), or 6.

Case based ranking proceeds as follows. First, the number of detections to allow, D, is computed as described above. Then, the delta discriminants are rank ordered, largest to smallest. Detections with rank greater than D have their class labels set to '0'.

Once the case detections are ranked to D, a second condition is applied; no more than M detections can have a classification label of '1' on any one image. If an image has more than M detections with the label equal to '1', the detections from that image are again rank ordered, largest to smallest by their delta discriminants. Any detection on an image with rank greater than M has its classification label set to '0'.

Values for M and N may be set independently based on the category of detection. Let the maximum number of density detections equal N_density and the maximum number of microcalcification detections equal N_microcalc. Then, the maximum number of detections per case equals the sum of N_density and N_microcalc.

In a preferred embodiment, the density and microcalcification detections are limited to the first M_density=3 and M_microcalc=2. That is, within each image, the density detections are subsequently rank ordered from 1 to M_density. Density detections of rank value 1 to M_density retain the class label of '1' while those beyond the limit receive the class label of '0'. Similarly, the microcalcification detections are rank ordered from 1 to M_microcalc. Microcalcification detections of rank value 1 to M_microcalc retain the class label of '1' while those beyond the limit receive the class label of '0'.

This is a general and powerful method for distributing a limited number of CAD indications across the images in a case. The only requirement is that the detections from all the images in the case have associated quality scores by which to be rank ordered. Furthermore, it has been verified that in some cases, case based ranking simultaneously finds more cancer while reducing the total number of marks per case. The following section illustrates the usefulness of case based ranking.

As an example of case based ranking, consider the following set of density detections and corresponding sums of delta discriminant scores as shown in Table 1. To better appreciate the benefits of case based ranking, first consider the strategy of image based ranking. An example of image based ranking would be to pass the top two ranked detections from each image, the results of which are as shown in Table 2. There are eight surviving detections, two for each image. In this example, one detection is a true positive, for detection index 9. All other detections are false positives.

Now consider the results of case based ranking over the same set of detections. Table 3 shows the benefits of CBR with a limit of six detections per case. In this example, ranking the collection of all detections within a case and limiting to the six best, an additional cancer is found with fewer false positives than for the image based ranking method. In this example, the cancer on Image 2 is the third "best" detection in the case. Case based ranking allows this detection to be retained, while image based ranking does not.

TABLE 1

Example set of density detections and sum of delta discriminant scores.

| Image Index | Detection Index | Truth | sum(Δ disc) | Image Rank | Case Rank |
|---|---|---|---|---|---|
| 1 | 1 | Normal | 19 | 1 | 6 |
| 1 | 2 | Normal | 12 | 2 | 10 |
| 2 | 3 | Cancer | 24 | 3 | 3 |
| 2 | 4 | Normal | 29 | 1 | 1 |
| 2 | 5 | Normal | 28 | 2 | 2 |
| 3 | 6 | Normal | 18 | 2 | 7 |
| 3 | 7 | Normal | 21 | 1 | 4 |
| 4 | 8 | Normal | 15 | 3 | 9 |
| 4 | 9 | Cancer | 20 | 1 | 5 |
| 4 | 10 | Normal | 17 | 2 | 8 |

TABLE 2

Image Based Ranking Results.

| Image Index | Detection Index | Truth | Image Rank | Class Label |
|---|---|---|---|---|
| 1 | 1 | Normal | 1 | 1 |
| 1 | 2 | Normal | 2 | 1 |
| 2 | 3 | Cancer | 3 | 0 |
| 2 | 4 | Normal | 1 | 1 |
| 2 | 5 | Normal | 2 | 1 |
| 3 | 6 | Normal | 2 | 1 |

TABLE 2-continued

Image Based Ranking Results.

| Image Index | Detection Index | Truth | Image Rank | Class Label |
|---|---|---|---|---|
| 3 | 7 | Normal | 1 | 1 |
| 4 | 8 | Normal | 3 | 0 |
| 4 | 9 | Cancer | 1 | 1 |
| 4 | 10 | Normal | 2 | 1 |

Image Context Processing

Whereas case based ranking examines all the same category detections across all the images of a case, image context processing removes selected combinations of detections across and within detection categories for an image. The motivation for this stage is that certain combinations of detections are observed to predominantly occur on normal images of the training database.

TABLE 3

Case Based Ranking Results.

| Image Index | Detection Index | Truth | Case Rank | Class Label |
|---|---|---|---|---|
| 1 | 1 | Normal | 6 | 1 |
| 1 | 2 | Normal | 10 | 0 |
| 2 | 3 | Cancer | 3 | 1 |
| 2 | 4 | Normal | 1 | 1 |
| 2 | 5 | Normal | 2 | 1 |
| 3 | 6 | Normal | 7 | 0 |
| 3 | 7 | Normal | 4 | 1 |
| 4 | 8 | Normal | 9 | 0 |
| 4 | 9 | Cancer | 5 | 1 |
| 4 | 10 | Normal | 8 | 0 |

An overview of image context processing is now provided. The density and microcalcification detections are assigned confidence ratings of high or low, based on comparing the delta discriminant values to appropriate thresholds, wherein the thresholds are obtained from training data. Other embodiments may use more than two confidence values. The number, type, and confidence of the set of detections are recorded. From an analysis of the training data, it was observed that certain combinations of detections occur predominantly on normal images. Therefore, whenever these certain combinations occur, all detections from that image are removed. This step greatly increases the number of unmarked images without unduly lowering sensitivity.

Image context processing is now described in detail. Image context quality scores are computed for each detection as follows. For density detections, the delta discriminants are averaged. For microcalcifications, the delta discriminant is used as is. The quality scores are compared to predetermined thresholds to assign confidence ratings to each detection. The predetermined thresholds for each detection category are obtained from an analysis of a training database such that a majority of true positive detections receive a high confidence rating and a majority of the false positive detections receive a low confidence rating.

In a preferred embodiment, consider up to three density and one microcalcification detections on any image. Each detection receives the confidence rating of high or low. In this case, the number of possible combinations of density and microcalcification detections is 29, as shown in Table 4.

Table 4 shows the results of assigning image context combinations to approximately 3200 processed images where approximately 600 images contain malignant microcalcifications and about 600 images contain malignant density lesions. The first column enumerates the combinations, the second column represents the combination category. The letters "C" and "D" represent microcalcification and density detections, respectively. The capital letters denote high confidence ratings while lowercase letters denote lower confidence ratings. The last four columns represent the number of occurrences that the corresponding combination occurred on an image with the given truth category. For example, for index 1, a single low confidence density detection occurred 6 times on images with a malignant mass, 0 times on images with a malignant cluster of microcalcifications, 1 time on an image with both lesion categories, and 324 times on normal images. Observe that when the combination is one of the following:

i) One low confidence density indication (d);
ii) Three low confidence density indications (ddd);
iii) One low confidence microcalcification indication and one low confidence density indication (cd);

then the images are most often normal. In such instances all detections on the images may be dropped without unduly decreasing sensitivity.

TABLE 4

Experimental Results of Categorizations

| | Combination | Image Truth | | | |
|---|---|---|---|---|---|
| Index | of Confidence Ratings | Density | MicroCalc | Density and MicroCalc | Normal |
| 1 | d | 6 | 0 | 1 | 324 |
| 2 | D | 27 | 0 | 5 | 258 |
| 3 | dd | 7 | 0 | 1 | 163 |
| 4 | dD | 19 | 0 | 2 | 172 |
| 5 | DD | 33 | 0 | 4 | 133 |
| 6 | c | 0 | 9 | 0 | 87 |
| 7 | C | 0 | 43 | 3 | 34 |
| 8 | cd | 1 | 4 | 0 | 72 |
| 9 | cD | 18 | 5 | 2 | 50 |
| 10 | Cd | 0 | 46 | 6 | 47 |
| 11 | CD | 8 | 35 | 7 | 33 |
| 12 | cdd | 3 | 4 | 3 | 33 |
| 13 | cdD | 24 | 16 | 13 | 56 |
| 14 | cDD | 8 | 2 | 2 | 31 |
| 15 | Cdd | 1 | 16 | 0 | 23 |
| 16 | CdD | 3 | 20 | 3 | 7 |
| 17 | CDD | 6 | 16 | 14 | 13 |
| 18 | ddd | 0 | 0 | 0 | 28 |
| 19 | ddD | 6 | 0 | 0 | 65 |
| 20 | dDD | 8 | 0 | 1 | 39 |
| 21 | DDD | 12 | 0 | 0 | 39 |
| 22 | cddd | 5 | 1 | 0 | 11 |
| 23 | cddD | 2 | 1 | 2 | 10 |
| 24 | cdDD | 4 | 0 | 0 | 4 |
| 25 | cDDD | 7 | 0 | 2 | 6 |
| 26 | Cddd | 1 | 7 | 0 | 2 |
| 27 | CddD | 4 | 11 | 10 | 4 |
| 28 | CdDD | 0 | 6 | 3 | 4 |
| 29 | CDDD | 2 | 8 | 0 | 6 |
| 30 | No Marks | 0 | 0 | 0 | 349 |

Normalcy Classification

Normalcy classification refers to the process of examining the discriminants from each category of detection across all the images in the case. When normalcy conditions are satisfied, the set of density and/or microcalcification detections are removed from all images in the case. The "normalcy" condition is assigned by a classifier using quality scores derived from all the detections across a case as input features. The quality scores input to the Normalcy stage are the density and microcalcification delta discriminant values.

A further input is the assigned class label for each detection. Separate normalcy classifiers are used for each lesion category.

It is important to note that detections are not deleted by the previous post processing steps. The delta discriminants for all detections, whether identified with class label of '1' or '0' are used to generate normalcy features.

The microcalcification normalcy classifier requires two "microcalcification normalcy" features. They are:

Microcalcification Normalcy Feature 1—The delta discriminant values from the microcalcification classifier are sorted by image for all the images in the case. The maximum delta discriminant value for each image is stored. Then, the stored, per image delta discriminants are searched across all the images in the case. The maximum from the across image search is used as the first microcalcification normalcy feature.

Microcalcification Normalcy Feature 2—The maximum delta discriminant value for each image is stored. Then, the within-image maximums are averaged across all images in the case to provide the second normalcy feature.

These two microcalcification normalcy features are used as inputs to the microcalcification normalcy classifier. One embodiment may be a statistical quadratic classifier. The weights of this classifier are designed using a training database of cases of two categories: normal cases and cases containing microcalcifications associated with malignancies. Two discriminant functions are obtained. One discriminant indicates a "normal" case in the microcalcification sense, and the other a "not normal" case in the microcalcification sense. The "not normal" discriminant is subtracted from the "normal" discriminant producing a microcalcification normalcy delta discriminant, or normalcy value. When this normalcy value is greater than a predetermined threshold, all microcalcification detections are removed from the case.

First, the sum of the delta discriminants are computed for every detection on each image. Even detections with class labels of '0' are considered in this step. Noting that each detection includes two delta discriminants (mass and spiculated mass), a sum of delta discriminants is computed for each detection, and the detection on each image with the maximum sum of delta discriminants is identified.

Density normalcy features are computed from the delta discriminants. The designator "PT" in a feature's description indicates that the power transform is applied to the measurement. The following normalcy features are computed using the identified per image detections as follows:

Density Normalcy Feature 1—Compute the mean of the mass and spiculated mass delta discriminants for the identified detection on each image. Then, searching across all images in the case, select the minimum of the mean delta discriminants as the first feature (PT).

Density Normalcy Feature 2—For the identified detection on each image, select the maximum of the two delta discriminants, mass or spiculated mass. Then, computing the mean of the selected delta discriminants as the second feature (PT).

Density Normalcy Feature 3—For the identified detection on each image, select the minimum of the two delta discriminants, mass or spiculated mass. Then, computing the mean of the selected delta discriminants as the third feature.

These three density normalcy features are used as inputs to the density normalcy classifier. One embodiment may be a statistical quadratic classifier. The weights of this classifier are designed using a training database of cases of two categories: normal cases and cases containing malignant densities. Two discriminant functions are obtained. One discriminant indicates a "normal" case in the density sense, and the other a "not normal" case in the density sense. The "not normal" discriminant is subtracted from the "normal" discriminant producing a density normalcy delta discriminant, or normalcy value. When this normalcy value is greater than a predetermined threshold, all density detections are removed from the case.

The output of the normalcy stage is a set of detections and associated class labels. The detections with class labels of '1' are displayed overlaid on the medical images as requiring further interpretation by a radiologist.

In view of the above description, it should be apparent that the present invention provides an improved method and system for identifying detections on digital images which meet criteria indicative of cancerous lesions, and particularly provides a method and system which may be advantageously used to identify cancerous lesions on mammograms obtained from a patient's screening visit. As may be further noted from the above description, the present invention presents processes for classifying microcalcifications and detections, and for post processing the detections in such a manner that the number of false positive detections is reduced while providing the further advantage of increasing the sensitivity of the method and system, resulting in increased accuracy in identifying cancerous lesions.

It should additionally be noted that, while the present invention has been described in the context of analyzing detections found on mammograms, the method and system described herein may be applied to analysis of other medical images.

While the method and system described herein constitute preferred embodiments of the invention, it should be understood that the invention is not limited to the precise method and system described herein, and that changes may be made therein without departing from the scope of the invention which is defined in the appended claims.

What is claimed is:

1. A method for computing features from a detection on an input image, including the steps of:

a) providing two regions on the input image corresponding to a first area within a detection and to a second area outside of the detection;

b) computing measurements based on values derived from the two regions on the input image;

c) computing the mean of the measurements for each region;

d) computing the standard deviation of the measurements for each region;

e) computing the feature of the detection in accordance with the equation:

$$\text{Feature} = \text{SIGN}(\mu_1 - \mu_2) * (\mu_1 - \mu_2)^2 / (\sigma_1^2 + \sigma_2^2);$$

where, $\text{SIGN}(\mu_1 - \mu_2)$ equals +1 for positive arguments and −1 for negative arguments; and where, $\mu_i$ is the mean of the $i^{th}$ region, and $\sigma_i$ is the standard deviation of the $i^{th}$ region.

2. The method of claim 1 wherein the measurements comprise pixel values.

3. The method of claim 1 wherein the measurements comprise Laws E5L5 values.

* * * * *

UNITED STATES PATENT AND TRADEMARK OFFICE
CERTIFICATE OF CORRECTION

PATENT NO.    : 6,757,415 B1
DATED         : June 29, 2004
INVENTOR(S)   : Rogers et al.

It is certified that error appears in the above-identified patent and that said Letters Patent is hereby corrected as shown below:

Column 12,
Line 28, "and •2 = (t/2.0). Each DoG kernel is individually convolved" should read
-- and •2 = (t/2.0). Each DoG kernel is individually convolved --;

Column 14,
Line 11, "locally bright-region. However, due to the complexity of" should read
-- locally bright region. However, due to the complexity of --;

Column 18,
Line 17, "Features are computed for bjects passing the expert filter" should read
-- Features are computed for objects passing the expert filter --; and Column 20,
Line 8, "region with the largesr sum of difference of discriminants is" should read
-- region with the largest sum of difference of discriminants is --.

Signed and Sealed this

Eighth Day of March, 2005

JON W. DUDAS
*Director of the United States Patent and Trademark Office*